United States Patent
Lu et al.

(10) Patent No.: US 7,739,014 B2
(45) Date of Patent: *Jun. 15, 2010

(54) INTEGRATED CONTROL SYSTEM FOR STABILITY CONTROL OF YAW, ROLL AND LATERAL MOTION OF A DRIVING VEHICLE USING AN INTEGRATED SENSING SYSTEM TO DETERMINE A FINAL LINEAR LATERAL VELOCITY

(75) Inventors: Jianbo Lu, Livonia, MI (US); Joseph C. Meyers, Farmington Hills, MI (US)

(73) Assignee: Ford Global Technolgies, Dearborn, MI (US)

( * ) Notice: Subject to any disclaimer, the term of this patent is extended or adjusted under 35 U.S.C. 154(b) by 897 days.

This patent is subject to a terminal disclaimer.

(21) Appl. No.: 11/468,634

(22) Filed: Aug. 30, 2006

(65) Prior Publication Data

US 2008/0086251 A1    Apr. 10, 2008

(51) Int. Cl.
 G05D 1/08    (2006.01)
 G06F 7/00    (2006.01)

(52) U.S. Cl. .............................. 701/48; 701/70; 303/146
(58) Field of Classification Search .................. None
 See application file for complete search history.

(56) References Cited

U.S. PATENT DOCUMENTS

| 5,742,919 | A * | 4/1998 | Ashrafi et al. .................. 701/70 |
| 6,338,012 | B2 * | 1/2002 | Brown et al. .................... 701/1 |
| 6,505,108 | B2 * | 1/2003 | Bodie et al. .................... 701/41 |
| 7,480,547 | B2 * | 1/2009 | Brown et al. .................... 701/1 |
| 2005/0080543 | A1 * | 4/2005 | Lu et al. ........................ 701/70 |
| 2007/0067085 | A1 * | 3/2007 | Lu et al. ........................ 701/70 |

* cited by examiner

Primary Examiner—Michael J. Zanelli
(74) Attorney, Agent, or Firm—Angela M. Brunetti; Fredrick Owens

(57) ABSTRACT

A method of controlling a vehicle includes determining a front lateral tire force, a rear lateral tire force, and determining a lineal sideslip angle from the front lateral tire force and the rear lateral tire force. The method also includes determining a load transfer correction. The method also includes determining a final linear lateral velocity in response to the linear sideslip angle and the load transfer correction and controlling the vehicle in response to the final linear lateral velocity.

20 Claims, 8 Drawing Sheets

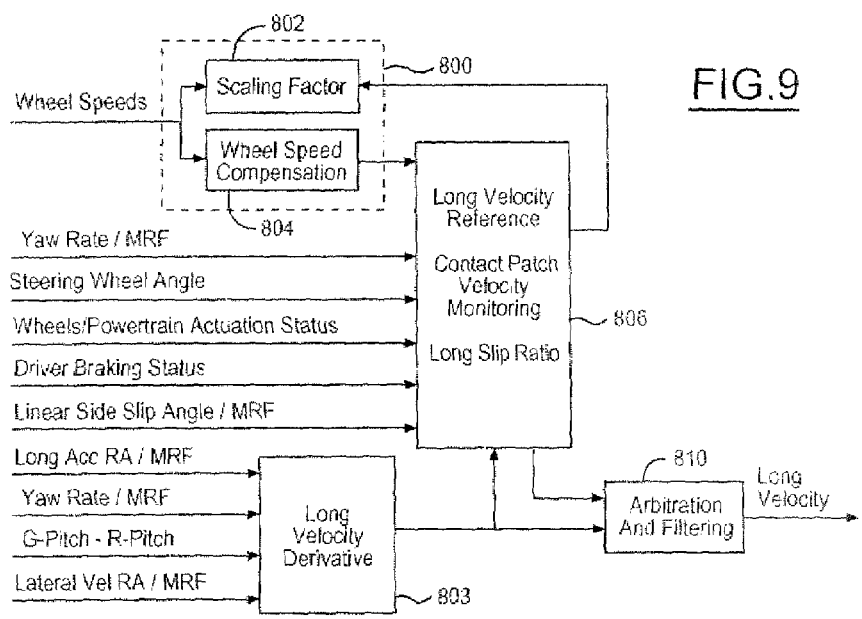
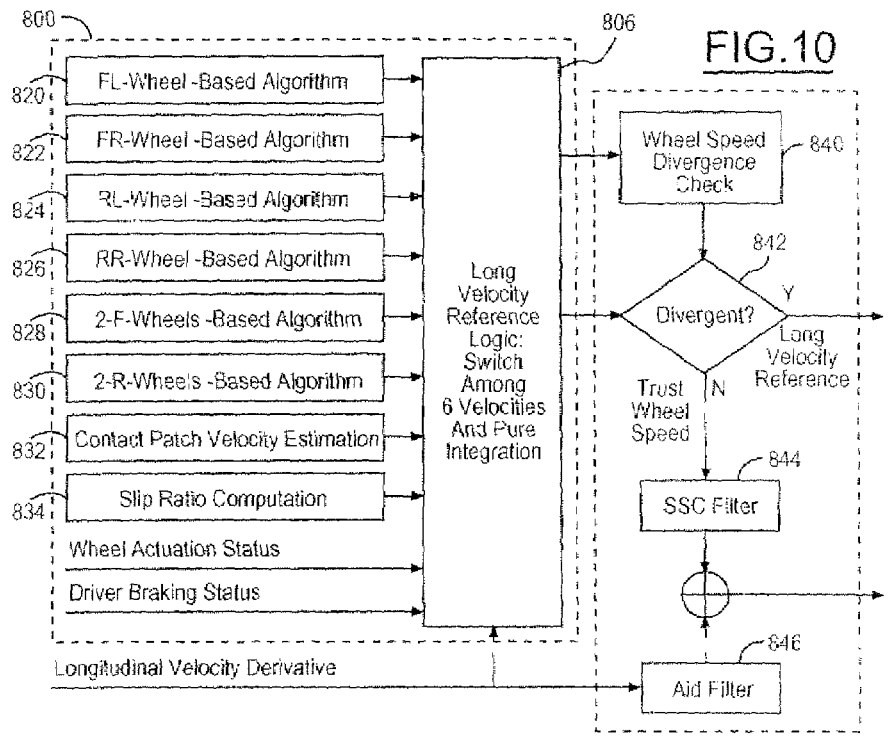

INTEGRATED CONTROL SYSTEM FOR STABILITY CONTROL OF YAW, ROLL AND LATERAL MOTION OF A DRIVING VEHICLE USING AN INTEGRATED SENSING SYSTEM TO DETERMINE A FINAL LINEAR LATERAL VELOCITY

TECHNICAL FIELD

The present invention relates generally to a control apparatus for controlling a system of an automotive vehicle in response to sensed dynamic behavior, and more specifically, to a method and apparatus for dynamically controlling a yaw, roll and lateral stability of a vehicle in response to the motion states of the vehicle measured and sensed through an integrated sensing system.

BACKGROUND

Various automotive vehicles have recently begun including vehicle system controls. Vehicle system controls use the sensors to sense a vehicle's dynamics, the driver's intention or even the environmental information around the vehicle; use the electronic control units (ECUs) to process the sensed information; and use the available actuators to conduct suitable control actions requested from the ECUs so as to achieve controlled performance for a driving vehicle. The ongoing goal of the vehicle system controls is to achieve an improved system performance or new functions. Ultimately, the various vehicle control systems need to be coordinately controlled so as to achieve enhanced system level control performances for ride, handling, safety and fuel economy of the vehicle.

One of the vehicle system controls are the various types of vehicle dynamics controls, which use electronically controlled chassis, powertrain or drivetrain subsystems to augment the driver's controllability of the vehicle for ride, handling and safety purposes.

Several existing stability control systems are available. For example, the yaw stability control system (YSC) or a roll stability control system (RSC) are currently equipped on millions of vehicles. The separated stability control functions are the focuses of the existing systems.

It may be desirable to integrate the functions of the various dynamic control systems. One reason that such an integration is desirable is that there is overlap among the operation ranges of the individual control systems. For example, a rollover control system tries to force the vehicle under-steer more during an un-tripped rollover event, while an ESC system might take the vehicle's response under RSC control as an indication of the vehicle's true under-steer to conduct the vehicle's under-steer correction. If there is no integration between RSC and YSC, the control action of those may cancel each out. Hence a successful implementation of RSC and YSC in the same vehicle will need control coordination. One of the enablers of the coordination relies in the accurate discrimination of the features of different unstable vehicle dynamics, which require different control functions.

With current advances in mechatronics, the aforementioned technology enabler is possible. For example, the advanced sensors might be used. Such advanced sensors together with other mechatronics not only help function integration, they also help improve the individual vehicle stability control performances and provides opportunities for achieving control performances which were previously reserved for spacecraft and aircraft. For example, gyro sensors, previously only used in aircraft and spacecraft, have now been incorporated in various vehicle dynamics controls and the anti-lock brake systems once invented for airplanes are now standard automotive commodities.

With the application of the advanced sensors and mechatronics, superior information about the vehicle's dynamics states can be obtained which can be used to calculate effective feedback and feedforward controls for various functions and their integrations. It is especially effective to use the superior information from the advanced sensors and their innovative sensing algorithms to identify the scenarios which are otherwise undetectable during a driving involved with complicated road conditions and aggressive driving inputs from the driver.

A typical vehicle stability control and an integrated stability control system sense and control a vehicle's dynamics conditions described in the 3-dimensional space. Those control systems might require the measurements of all or part of the three-dimensional motions which include the rotational motions along the vehicle's roll, pitch, and yaw directions and the translation motion along the vehicle's longitudinal, lateral and vertical directions.

More specifically, in a typical vehicle stability control system such as a yaw stability control system or a roll stability control system, the primary control task is to stabilize the vehicle in yaw or roll directions, which will likely involve motions along its roll and yaw directions, and longitudinal and lateral directions. The coupling between different motion directions may not be as strong as in an aircraft or a spacecraft, however, they cannot be neglected in most of the control regions where unstable vehicle dynamics is seen. Unstable vehicle dynamics might involve rolling over or yawing out of the traveling course during aggressive driving when the driver's inputs are well beyond the values allowed by the adhesion limit of the road surface. For example, the excessive steering of a vehicle will likely lead to a unstable yaw and lateral motions, which further cause large rolling motion towards the outside of the turn. If the driver brakes the vehicle during such an excessive steering, the vehicle will also have roll and pitch motions, large load transfer and large lateral discursion. It is desirable for a high performance stability control system to integrate YSC, RSC and lateral stability control (LSC) such that the coupled unstable vehicle dynamics can be stabilized.

Theoretically, if there are sensors which can directly measure the vehicle's roll states, yaw states and lateral states during complicated unstable dynamics, the successful integration would involve: (i) identifying the dominated direction where a primary unstable dynamics can occur; (ii) prioritizing control functions when multiple safety-critical unstable vehicle dynamics can occur; (iii) maximizing control functions when multiple unstable vehicle dynamics are equally critical; (iv) determining transition control actions from one stability control function to another or to a normal operation function. The decision rule for any of the above actions needs close discrimination. Unfortunately, there are no direct measurements of the aforementioned vehicle states. Even the advanced sensors can only provide indirect measurements of the involved vehicle states. Therefore, intelligent sensing algorithms are required.

Therefore, it would be desirable to integrate the YSC, RSC and LSC functions to provide accurate determination of the involved roll, yaw and lateral motions of a vehicle. The controllable variables associated with those motions might be the vehicle's global and relative angular motion variables such as attitudes and the directional motion variables such as the longitudinal and lateral velocities. For instance, in RSC, the relative roll angle between the vehicle body and the road surface is controlled. In LSC, the relative yaw angle between the vehicle's travel direction and the path is controlled. The coupled dynamics among roll, yaw and pitch motions and the elevated (banked or inclined) road caused vehicle motions all need to be differentiated. The driver's intention-based vehicle dynamic behavior will also need to be determined. Due to the fact that the sensors measure the total motion of the vehicle, the sensor measurements contain the total information that includes the values of the driver-induced dynamics, the road geometry-induced dynamics and the dynamics from the gravity together with sensor uncertainties. It is not hard to find that separating the driver-induced dynamics and the road-induced dynamics from the total sensor measurements need intelligent algorithms. Only if such information is determined from the total sensor measurements, the control system can provide adequate control actions in needed situations (driver-induced excessively dynamic or unstable) and generate less occurrences of false control action in unneeded situations such as in certain road geometry-induced dynamics.

In order to achieve the aforementioned separation of the driver maneuver-induced vehicle dynamics information and the road geometry-induced dynamics information from the sensor uncertainties, gravity-induced dynamics terms, a new vehicle sensing technology which contains an inertial measurement unit (IMU) has been pursued at Ford Motor Company. This sensing system is called an Integrated Sensing System (short to ISS) in this invention.

The IMU has been used in inertial navigation system (INS) for aircraft, spacecraft and satellite for decades. Typically an INS system determines the attitude and directional velocity of a flight vehicle through the sensor signals from the IMU sensors and GPS signals. The IMU sensor set includes 3 gyros and 3 linear accelerometers. The INS contains an IMU and a processor unit to compute the navigation solutions necessary for navigation, attitude reference and various other data communication sources. As the same token, the ISS will also be used (but not limited) to determine the vehicle's attitude and directional velocities with the exception that GPS signals are not necessarily used but, instead, the other sensor signals such as ABS wheel speed sensor signals are used.

With the availability of the IMU sensor cluster equipped with a vehicle stability control system, several effects which are impossible to differentiate in the traditional stability control may now be included. For example, the effect of the road bank was not accurately included in the existing control algorithm. Many known systems either rely upon basic assumptions regarding conditions such as driving on a flat surface (no pitch or bank angle) or on an estimated road bank information that is usually accurate in non-event situation (e.g., steady state driving) but inaccurate in vehicle stability control events. Due to the use of IMU sensor cluster in the ISS system, the road bank and grade information may now be fairly accurately determined.

Notice that the vehicle's attitudes are required to separate the gravity contamination in the acceleration sensor signals. This can be seen from the following example. The vehicle's lateral sliding used in LSC can be characterized by its lateral velocity defined along the lateral direction of the vehicle body. Such a velocity cannot be directly measured and it is determined from the lateral accelerometer measurement. The total output of the lateral accelerometer contains information that is related to the variables other than the lateral velocity. This information includes gravity contamination, the centripetal accelerations, the derivative of the lateral velocity, the sensor uncertainties. On a banked road, the gravity contributes to the lateral accelerometer measurement as significantly as the combination of the vehicle's true lateral velocity derivative and the centripetal acceleration. Due to the fact that the gravity is fixed in both its magnitude and its direction with respect to the sea level, the vehicle global attitudes can be used to find the relative position between the gravity vector and the vehicle's body directions. For this reason, the vehicle global attitudes can be used to compensate the gravity influence in the measured lateral acceleration such that the vehicle lateral velocity might be isolated and determined from the lateral acceleration sensor measurement. The same argument would hold for using pitch attitude to compensate the longitudinal accelerometer sensor signals for computing the vehicle's longitudinal velocity.

While driving on a level ground, the vehicle lateral acceleration tends to be larger than the value sustained by the limits of adhesion on a dry surface with high adhesion due to the large load transfer. On a slippery surface with low adhesion, the vehicle's lateral acceleration might be close to the limit of adhesion of the road surface. The acceleration sensors used in the existing YSC system could not provide information to differentiate this especially when a vehicle experiences large roll and pitch accelerations in excessive maneuvers. Due to the relative attitude determination from the PAD unit in the ISS system, such load transfer effects may be easily characterized. Therefore a stability control system using ISS system output would be able to achieve the same physics in the low adhesion road surface with in the high adhesion road surface, and less deviation of control performance in low adhesion road from the control performance in the high adhesion road will be experienced.

It is the objective of the current disclosure to provide an integrated sensing system and use such information for an integrated stability control system to coordinate a yaw stability control function, roll stability control function and a lateral stability control function to achieve superior control performance in comparison with the existing vehicle stability control systems.

SUMMARY

The present invention's focus is on the type of vehicle dynamic control systems that control the multiple motions of the vehicle along yaw, roll and lateral directions during the driver initiated maneuvers. The multiple motions are likely to be unstable if their controls are only conducted by an ordinary driver. For this reason, such vehicle dynamics controls are also called the vehicle stability control systems.

One theme of this invention is an integrated treatment of the potential vehicle stability controls through superior vehicle's operation state determination using an integrated sensing system. That is, an integrated stability control system (ISCS) is used to stabilize individual or multiple unstable vehicle dynamics at the same time. More specifically, integration of yaw, roll and lateral stability control systems is desirable.

The present invention provides an integrated sensing system (ISS) and uses the information from such a sensing system to conduct integrated stability control system which integrates a yaw stability control system (YSC), a roll stability control (RSC) system and a lateral stability control (LSC) system together with an anti-brake-lock system (ABS), and traction control system (TCS). The integrated sensing system uses signals measured from the sensor set beyond the sensor configuration used in the traditional YSC, RSC, ABS and TCS systems. The sensors used in the ISS include a six degree of freedom inertial measurement unit (IMU), a steering wheel angle (SWA) sensor, four ABS wheel speed sensors, a master cylinder brake pressure sensor, a brake pedal force sensor, and other sensors. The powertrain and drivetrain information and the other available information are also fed into the ISS.

Notice that the traditional ESC system integrates ABS, TCS and yaw stability management functions through individual brake pressure controls (incremental to the driver requested brake pressures). The main goal of an ESC is to augment the driver's controllability of the vehicle at the limit of the vehicle dynamics for a given road surface traction and for a given set of the driver requested driving inputs. The controllability of ESC mainly focuses on the vehicle's yaw rate response with respect to the driver's intension (determined from the inputs such as the driver's steering wheel angle input, the vehicle speed, and the like).

Although various ESC systems claim to have certain lateral stability control, its effectiveness is limited due to the fact that the sensor set used in ESC cannot accurately and robustly differentiate the effect of the road bank and the vehicle's lateral instability. If the vehicle is stable in lateral direction, the bank effect may be determined. But when the vehicle is driving close to lateral instability on a medium-sized bank road, it may not be possible to separate the vehicle's lateral siding motion from the bank influence (gravity contamination) in the lateral acceleration sensor measurement. This is especially the case when the vehicle is driven on low friction road surfaces.

The vehicle's lateral sliding usually increases the vehicle dynamically unstable tendency such that the vehicle is hard to control by ordinary drivers. Hence one of the performance requirements in vehicle stability controls is to attenuate the lateral sliding as much as possible. Notice that such a performance requirement is different from car racing, where vehicle lateral sliding is sacrificed for vehicle driving speed. One reason is that racecar drivers are usually capable and experienced drivers, who can handle the vehicle well even if it is experiencing large lateral sliding. The vehicle's lateral sliding used in LSC can be characterized by its lateral velocity defined along the lateral direction of the vehicle body. Such a velocity cannot be directly measured and is determined from the lateral accelerometer measurement. The total output of the lateral accelerometer contains information that is related to the variables other than the lateral velocity. This information includes gravity contamination, the centripetal accelerations, the derivative of the lateral velocity, and the sensor uncertainties. On a banked road, the gravity contributes to the lateral accelerometer measurement as significantly as the combination of the vehicle's true lateral velocity derivative and the centripetal acceleration. Due to the fact that gravity is fixed in both magnitude and direction with respect to the sea level, the vehicle global attitudes may be used to find the relative position between the gravity vector and the vehicle's body directions. For this reason, the vehicle global attitudes can be used to compensate the gravity influence in the measured lateral acceleration such that the vehicle lateral velocity might be isolated and determined from the lateral acceleration sensor measurement. The same argument would hold for using pitch attitude to compensate the longitudinal accelerometer sensor signals for computing the vehicle's longitudinal velocity.

Sideslip angle is the inverse tangent of the ratio of the lateral velocity and the longitudinal velocity of the vehicle defined on the vehicle's body fixed coordinate system. Therefore, its accurate determination must involve the accurate determination of the longitudinal and lateral velocities of the vehicle defined on the vehicle's body-fixed coordinate system.

Of course, various other sensors such as a roll rate sensor, steering angle sensor, longitudinal acceleration sensor, and a vertical acceleration signal may be combined together or independently with the above-mentioned sensors to further refine control of the system.

In a further aspect of the invention, a method of controlling a vehicle includes determining a front lateral tire force, a rear lateral tire force, and determining a lineal sideslip angle from the front lateral tire force and the rear lateral tire force. The method also includes determining a load transfer correction. The method also includes determining a final linear lateral velocity in response to the linear sideslip angle and the load transfer correction and controlling the vehicle in response to the final linear lateral velocity.

In a further aspect of the invention, a method of controlling a vehicle comprises determining the outputs from an integrated sensing system, using those outputs to conduct vehicle stability controls.

In a further aspect of the invention, a method of controlling a vehicle comprises integrating YSC, RSC and LSC through the output signals calculated in the integrated sensing system.

Other advantages and features of the present invention will become apparent when viewed in light of the detailed description of the preferred embodiment when taken in conjunction with the attached drawings and appended claims.

BRIEF DESCRIPTION OF THE DRAWINGS

FIG. 9 is a block diagrammatic view of a longitudinal velocity estimation block

FIG. 10 is a more detailed block diagrammatic view of a method for determining longitudinal velocity.

DESCRIPTION OF THE PREFERRED EMBODIMENT

Figure 1:
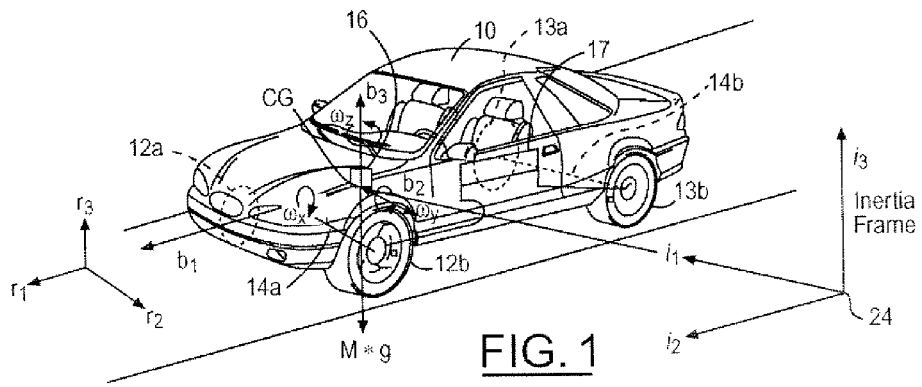
FIG. 1 is a diagrammatic view of a vehicle with variable vectors and coordinate frames according to the present invention.

In the following figures the same reference numerals will be used to identify the same components. The present invention is preferably used in conjunction with vehicle control systems including but are not limited to a yaw stability control (YSC) system, a roll stability control (RSC) system, a lateral stability control (LSC), an integrated stability control system (ISCS), or a total vehicle control system for achieving fuel economy and safety and other vehicle level performances. The system is also described with respect to an integrated sensing system (ISS) which uses a centralized motion sensor cluster such as an inertial measurement unit (IMU) and the other available but decentralized sensors. Although the centralized motion sensor such as an IMU is used, the methods described here are easily transferable to using the other discrete sensors.

Referring to FIG. 1, an automotive vehicle 10 with a vehicle dynamics control or an active safety system of the present invention is illustrated with the various forces and moments thereon during a stable vehicle dynamic condition. Vehicle 10 has front right (FR) and front left (FL) wheel/tires 12A and 12B and rear right (RR) wheel/tires 13A and rear left (RL) wheel/tires 13B, respectively. The vehicle 10 may also have a number of different types of front steering systems 14a and rear steering systems 14b, including having each of the front and rear wheels configured with a respective controllable actuator, the front and rear wheels having a conventional type system in which both of the front wheels are controlled together and both of the rear wheels are controlled together, a system having conventional front steering and independently controllable rear steering for each of the wheels, or vice versa. Generally, the vehicle has a weight represented as Mg at the center of gravity of the vehicle, where g=9.8 m/s² and M is the total mass of the vehicle.

As mentioned above, the system may also be used with the other vehicle dynamics controls such as ride and handling control systems including active/semi-active suspension systems, anti-roll bar, or the other safety systems such as airbags or passive safety devices deployed or activated upon sensing predetermined dynamic conditions of the vehicle.

The ISS unit 16 is coupled to the ISCS unit 18. The ISS unit 16 may comprise many different sensors as will be described further below. The sensors may also be used by the ISCS unit in various determinations such as to determine a wheel lifting event such as in an imminent rollover, determine various forces including normal forces at the wheels, determine a height and position of a mass, determine the instability trend of the unstable dynamics as in unstable roll or yaw motions, determine the driver's intention, determine the feedforward control commands to drive actuators, determine feedback control commands for the desired functions, and the like. The wheel speed sensors 20 are mounted at each corner of the vehicle and generate signals corresponding to the rotational speed of each wheel which are denoted as $w_1$, $w_2$, $w_3$, $w_4$ or $w_{slf}$, $w_{srf}$, $w_{slr}$, $w_{srr}$ for left-front, right-front, left-rear and right-rear wheels, respectively. The rest of the sensors used in ISS unit 16 may include the other decentralized sensors and a centralized motion sensor such as an IMU or a RSC sensor cluster mounted directly on a rigid surface of the vehicle body such as the vehicle floor or the chassis frame. The centralized sensor cluster may not directly measure the motion variables along the vehicle body fixed longitudinal, lateral or vertical directions, it only provide motion variable information of the vehicle body at the sensor location and along the sensor's local directions.

As those skilled in the art will recognize, the frame from $b_1$, $b_2$ and $b_3$ is called a body frame 22, whose origin is located at the center of gravity of the car body, with the $b_1$ corresponding to the x axis pointing forward, $b_2$ corresponding to the y axis pointing off the driving side (to the left), and the $b_3$ corresponding to the z axis pointing upward. The angular rates of the car body are denoted about their respective axes as $\omega_{bx}$ for the roll rate, $\omega_{by}$ for the pitch rate and $\omega_{bz}$ for the yaw rate. Calculations may take place in an inertial frame 24 that may be derived from the body frame 22 as described below. The longitudinal acceleration of the vehicle body is denoted as $a_{bx}$. The lateral acceleration of the vehicle body is denoted as $a_{by}$. The vertical acceleration of the vehicle body is denoted as $a_{bz}$.

As mentioned before, the centralized motion sensor might have different directions than the vehicle body-fixed directions. Such a centralized sensor cluster might be mounted on a specific location of the vehicle body. The frame system $s_1s_2s_3$ fixed on the sensor cluster body is called a sensor frame system. The sensor frame directions are denoted as $s_1$, $s_2$ and $s_3$, which are the x-y-z axes of the sensor frame. Notice that the sensor frame system is not necessary the same as the vehicle body fixed frame system $b_1b_2b_3$. One of the reasons is that the sensor mounting errors are possible in the production environment. For practical reasons, the centralized sensor cluster like an IMU may not be mounted on the same location which is of interest for computation purposes such as the vehicle's center of gravity or the rear axle of the vehicle body. However, it is evident that an IMU sensor measures enough information to be used to numerically translate the IMU sensor output to the motion variables at any location on the vehicle body. The six outputs of the IMU sensor along its sensor frame are denoted as $\omega_{sx}$, $\omega_{sy}$, $\omega_{sz}$, $a_{sx}$, $a_{sy}$ and $a_{sz}$ for the sensor cluster's roll rate, pitch rate, yaw rate, longitudinal acceleration, lateral acceleration and vertical acceleration.

The other frame used in the following discussion includes the moving road frame, as depicted in FIG. 1. The moving road frame system $r_1r_2r_3$ is fixed on the driven road surface, where the $r_3$ axis is along the average road normal direction of a plane called a moving road plane. The moving road plane is a flat plane which serves as an average representation of the four-tire/road contact patches and it is usually a fictitious plane. If the road surface is perfectly flat, then it coincides with the moving road surface. Let the four vertical coordinates of the centers of the contact patches with respect to the inertia frame or sea level be $z_0$, $z_1$, $z_2$, $z_3$ for the front-left, front-right, rear-left and rear-right corners, then the average moving road plane experienced by the driven vehicle should have the bank angle computed as $$\text{average road bank} = \frac{1}{4}\left(\frac{z_0 - z_1}{t_f} + \frac{z_2 - z_3}{t_r}\right) \quad (1)$$

where $t_f$ and $t_r$ are the half tracks of the front and rear axles, and the inclination angle computed as $$\text{average road slope} = \frac{1}{2}\left(\frac{z_2 - z_0}{b} + \frac{z_3 - z_1}{b}\right) \quad (2)$$

where b is the wheel base of the vehicle.

Notice that the moving road plane is moving and yawing with the vehicle body but it is not rolling and pitching with the vehicle body. The moving road frame is the right-hand orthogonal axis system $r_1r_2r_3$ in which the plane containing $r_1$ and $r_2$ axes coincides with the average moving road plane. That is, $r_1$-axis is the projection of the longitudinal axis of the vehicle body on to the average moving road plane, $r_2$-axis is the projection of the lateral axis of the vehicle body on to the average moving road plane, and $r_3$-axis points upwards which coincides with the normal direction of the average moving road plane. Notice that the moving road frame coincides with an ISO-8855's intermediate axis system if the vehicle is driven on a level ground. On a three-dimensional road, there is no counterpart defined in ISO-8855.

Figure 2:
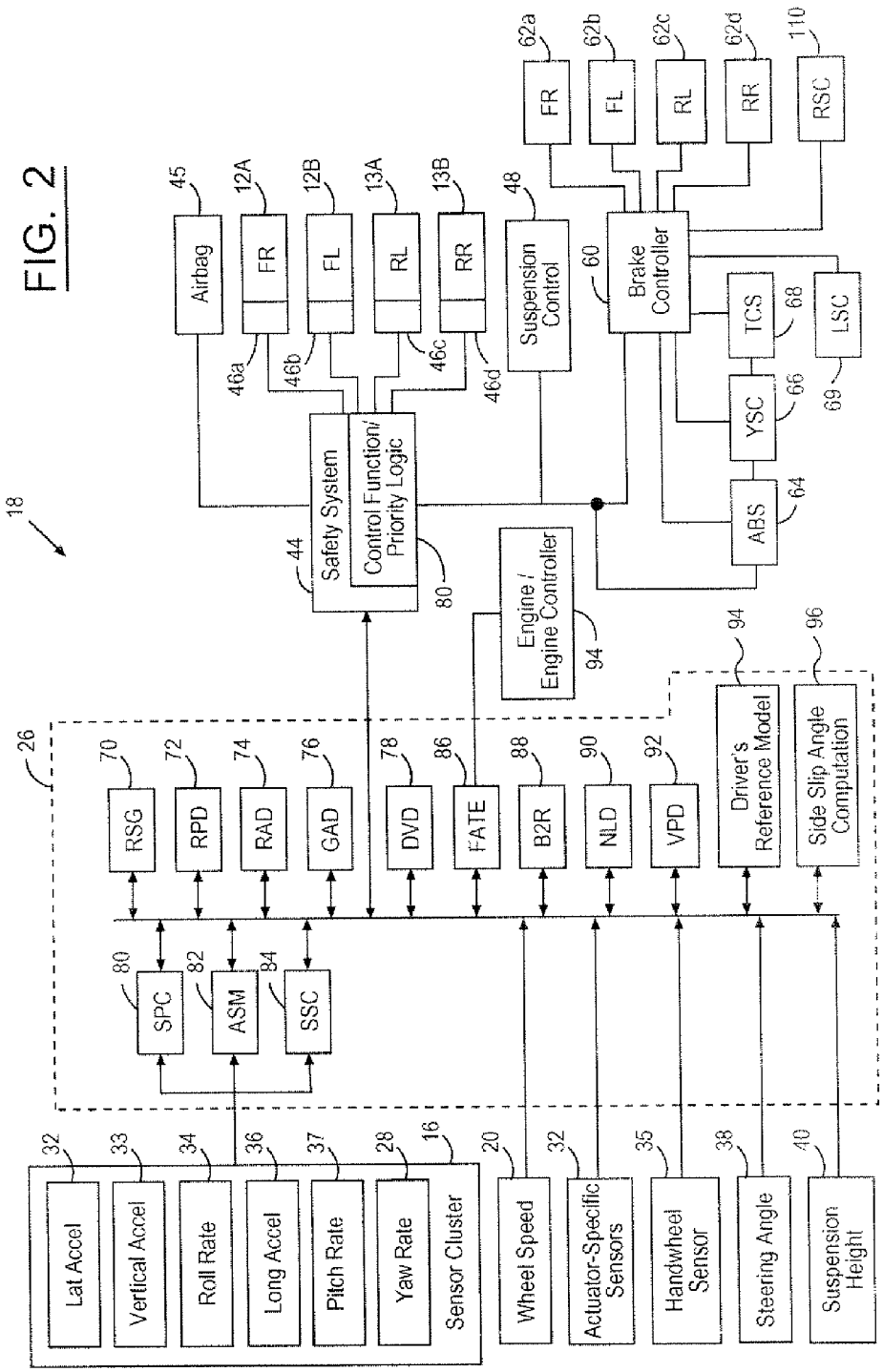
FIG. 2 is a block diagram of a stability system according to the present invention.

Referring now to FIG. 2, the ICSC unit 18 is illustrated in further detail having an ISS unit 26 used for receiving information from a number of sensors which may include a yaw rate sensor 28, a speed sensor 20, a lateral acceleration sensor 32, a vertical acceleration sensor 33, a roll angular rate sensor 34, a hand wheel sensor 35 (steering wheel within the vehicle), a longitudinal acceleration sensor 36, a pitch rate sensor 37, steering angle (of the wheels or actuator) position sensor 38 (steered wheel angle), a suspension position (height) sensor 40. It should be noted that various combinations and sub-combinations of the sensors may be used.

The sensor cluster 16 may be disposed within a single housing 43, and includes a roll rate sensor 34 generating a roll rate signal, a pitch rate sensor 37 generating a pitch rate signal, a yaw rate sensor 38 generating a yaw rate signal, a longitudinal acceleration sensor 36 generating a longitudinal acceleration signal, a lateral acceleration sensor 32 generating a lateral acceleration signal, and a vertical acceleration sensor 33 generating a vertical acceleration.

In typical aerospace application, the centralized motion sensor like IMU is always used together with global positioning system (GPS) signals. Recently, such an approach has also made into automotive applications, see for example, "Integrating INS sensors with GPS velocity measurements for continuous estimation of vehicle sideslip and tire cornering stiffness" by D. M. Bevly, R. Sheridan and J. C. Gerdes in proceeding of the 2001 American Control Conference. In the present invention, GPS is not required.

Based upon inputs from the sensors, the ISS unit 26 may feed information to the ISCS unit 44 that further drives the actions of the available actuators. Depending on the desired sensitivity of the system and various other factors, not all the sensors may be used in a commercial embodiment. The ISCS unit 44 may control an airbag 45 or a steering actuator 46A-46D at one or more of the wheels 12A, 12B, 13A, 13B of the vehicle. Also, other vehicle subsystems such as a suspension control 48 may be used for ride, handling and stability purpose.

Roll angular rate sensor 34 and pitch rate sensor 37 may be replaced by sensors sensing the height of one or more points on the vehicle relative to the road surface to sense the roll condition or lifting of the vehicle. Sensors that may be used to achieve this include but are not limited to a radar-based proximity sensor, a laser-based proximity sensor and a sonar-based proximity sensor. The roll rate sensor 34 may also be replaced by a combination of sensors such as proximity sensors to make a roll determination.

Roll rate sensor 34 and pitch rate sensor 37 may also be replaced by sensors sensing the linear or rotational relative displacement or displacement velocity of one or more of the suspension chassis components to sense the roll condition or lifting of the vehicle. This may be in addition to or in combination with suspension distance sensor 40. The suspension distance sensor 40 may be a linear height or travel sensor and a rotary height or travel sensor.

The yaw rate sensor 28, the roll rate sensor 34, the lateral acceleration sensor 32, and the longitudinal acceleration sensor 36 may be used together to determine that single wheel or two wheels of a vehicle are lifted and the quantitative information regarding the relative roll information between the vehicle body and moving road plane such as in RSC developed at Ford. Such sensors may also be used to determine normal loading associated with wheel lift.

The roll condition such as the relative roll angle of the vehicle body with respect to the road surface or with respect to the sea level may also be established by one or more of the following translational or rotational positions, velocities or accelerations of the vehicle including the roll rate sensor 34, the yaw rate sensor 28, the lateral acceleration sensor 32, the vertical acceleration sensor 33, a vehicle longitudinal acceleration sensor 36, lateral or vertical speed sensor including a wheel-based speed sensor 20, a radar-based speed sensor, a sonar-based speed sensor, a laser-based speed sensor or an optical-based speed sensor.

The ISS unit 26 may include sensing algorithms including but not limited to reference attitude and reference directional velocity determinations, global/relative attitude determination, directional velocity determination, sensor plausibility check, sensor signal conditioning, road parameter determination, and abnormal state monitoring.

The ISS unit 26 includes various control units controlling the aforementioned sensing algorithms. More specifically, these units may include: a reference signal unit 70 (reference signal generator (RSG)), which includes an attitude reference computation and a velocity reference computation, a road profile unit 72 (road profile determination unit (RPD)), an attitude unit or relative attitude determination unit 74 (RAD), a global attitude unit 76 (global attitude determination unit (GAD) and a directional velocity unit 78 directional velocity determination unit (DVD)), a sensor plausibility unit 80 (sensor plausibility check unit (SPC)), an abnormal state unit 82 (abnormal state monitoring unit (ASM)), a sensor signal compensating unit 84 (SSC), an estimation unit 86 (force and torque estimation unit (FATE)), a car body to fixed reference frame unit 93 (body to reference unit (B2R)) a normal loading unit 90 (normal loading determination unit (NLD)), a vehicle parameter unit 92 (vehicle parameter determination unit (VPD)), a four wheel driver reference model 94 and a sideslip angle computation 96. Signals generated from any one of the aforementioned units are referred to prediction of vehicle operation states signals.

The ISCS unit 44 may control the position of the front right wheel actuator 46A, the front left wheel actuator 463, the rear left wheel actuator 46C, and the right rear wheel actuator 46D. Although as described above, two or more of the actuators may be simultaneously controlled. For example, in a rack-and-pinion system, the two wheels coupled thereto are simultaneously controlled. Based on the inputs from sensors 28 through 43B, controller 26 determines a roll condition and/or wheel lift and controls the steering position and/or braking of the wheels.

The ISCS unit 44 may be coupled to a brake controller 60. Brake controller 60 controls the amount of brake torque at a front right brake 62a, front left brake 62b, rear left brake 62c and a rear right brake 62d. The functions performed through ISCS might include an RSC function 110, a YSC function 66, and an LSC function 69. The other functional units such as an anti-lock-braking system (ABS) unit 64 and a traction control system (TCS) unit 65 may be provided by the brake suppliers and are usually controlled through signals calculated from the supplier's sensing and control module (which might uses the same or part of the sensors used in this invention). Those functions might be improved through utilizing the signals calculated in ISS unit.

Speed sensor 20 may be one of a variety of speed sensors known to those skilled in the art. For example, a suitable speed sensor may include a sensor at every wheel that is averaged by the ISS unit 26. The algorithms used in ISS may translate the wheel speeds into the travel speed of the vehicle. Yaw rate, steering angle, wheel speed, and possibly a slip angle estimate at each wheel may be translated back to the speed of the vehicle at the center of gravity. Various other algorithms are known to those skilled in the art. Speed may also be obtained from a transmission sensor. For example, if speed is determined while speeding up or braking around a corner, the lowest or highest wheel speed may not be used because of its error. Also, a transmission sensor may be used to determine vehicle speed instead of using wheel speed sensors.

Although the above discussions are valid for general stability controls, some specific considerations of using them in RSC will be discussed. The roll condition of a vehicle during an imminent rollover may be characterized by the relative roll angle between the vehicle body and the wheel axle and the wheel departure angle (between the wheel axle and the average road surface). Both the relative roll angle and the wheel departure angle may be calculated in relative roll angle estimation module (RAD 74) by using the roll rate, lateral acceleration sensor signals and the other available sensor signals used in ISS unit. If both the relative roll angle and the wheel departure angles are large enough, the vehicle may be in either single wheel lifting or double wheel lifting. On the other hand, if the magnitude of both angles is small enough, the wheels are likely all grounded, therefore the vehicle is not rolling over. In case that both of them are not small and the double wheel lifting condition is detected or determined, the sum of those two angles will be used to compute the feedback commands for the desired actuators so as to achieve rollover prevention. The variables used for this purpose might be included in the ISS unit.

The roll information of a vehicle during an imminent rollover may be characterized by rolling radius-based wheel departure roll angle, which captures the angle between the wheel axle and the average road surface through the dynamic rolling radii of the left and right wheels when both of the wheels are grounded. Since the computation of the rolling radius is related to the wheel speed and the linear velocity of the wheel, such rolling-radius based wheel departure angle will assume abnormal values when there are large wheel slips. This happens when a wheel is lifted and there is torque applied to the wheel. Therefore, if this rolling radius-based wheel departure angle is increasing rapidly, the vehicle might have lifted wheels. Small magnitude of this angle indicates the wheels are all grounded. The variables used for this purpose might be included in the ISS unit.

The roll condition of the vehicle during an imminent rollover may be seen indirectly from the wheel longitudinal slip. If during a normal braking or driving torque the wheels at one side of the vehicle experience increased magnitude of slip, then the wheels of that side are losing longitudinal road torque. This implies that the wheels are either driven on a low mu surface or lifted up. The low mu surface condition and wheel-lifted-up condition may be further differentiated based on the chassis roll angle computation, i.e., in low mu surface, the chassis roll angle is usually very small. The variables used for this purpose might be included in the ISS unit.

The roll condition of the vehicle during an imminent rollover may be characterized by the normal loading sustained at each wheel. Theoretically, when a normal loading at a wheel decreases to zero, the wheel is no longer contacting the road surface. In this case a potential rollover is underway. Large magnitude of this loading indicates that the wheel is grounded. Normal loading is a function of the calculated chassis roll and pitch angles. The variables used for this purpose might be included in the ISS unit.

The roll condition of a vehicle during imminent rollover may be identified by checking the actual road torques applied to the wheels and the road torques, which are needed to sustain the wheels when they are grounded. The actual road torques may be obtained through torque balancing for each wheel using wheel acceleration, driving torque and braking torque. If the wheel is contacting the road surface, the calculated actual road torques must match or be larger than the torques determined from the nonlinear torques calculated from the normal loading and the longitudinal slip at each wheel. The variables used for this purpose might be included in the ISS unit.

The roll condition of a vehicle during an imminent rollover may be characterized by the chassis roll angle itself, i.e., the relative roll angle between the vehicle body and the wheel axle. If this chassis roll angle is increasing rapidly, the vehicle might be on the edge of wheel lifting or rollover. Small magnitude of this angle indicates the wheels are not lifted or are all grounded. Therefore, an accurate determination of the chassis roll angle is beneficial for determining if the vehicle is in non-rollover events and such computation is conducted in RAD unit in ISS.

The roll condition of a vehicle during imminent rollover may also be characterized by the roll angle between the wheel axle and the average road surface, which is called a wheel departure angle (WDA). If the roll angle is increasing rapidly, the vehicle has lifted wheel or wheels and aggressive control action needs to be taken in order to prevent the vehicle from rolling over. Small magnitude of this angle indicates the wheels are not lifted. The variables used for this purpose might be included in the ISS unit.

The ISCS unit 18 may include control function logic and control function priority logic. As illustrated, the logic resides within ISCS unit 44, but may be part of the ISS unit 26 and/or brake controller 60.

Figure 3:
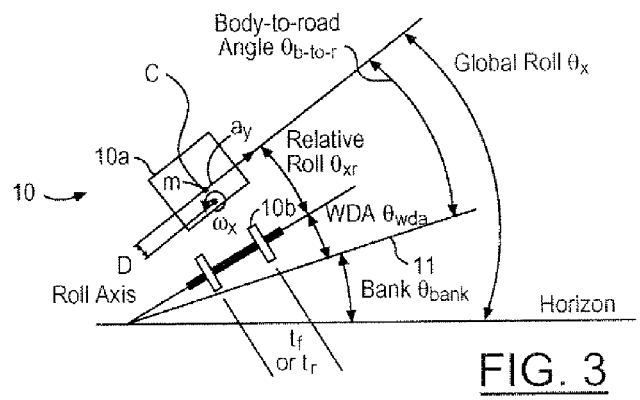
FIG. 3 is a front view of an automotive vehicle illustrating various angles according to the present invention.

Referring now to FIG. 3, the relationship of the various angles of the vehicle 10 (end view of which is shown) relative to the road surface 11 is illustrated. In the following, a reference road bank angle $\theta_{bank}$ is shown relative to the vehicle 10 on a road surface. The vehicle has a vehicle body 10*a* and wheel axle 10*b*. The wheel departure angle $\theta_{wda}$ is the angle between the wheel axle and the road. The relative roll angle $\theta_{xr}$ is the angle between the wheel axle 10*b* and the body 10*a*. The global roll angle $\theta_x$ is the angle between the horizontal plane (e.g., at sea level) and the vehicle body 10*a*.

Another angle of importance is the linear bank angle. The linear bank angle is a bank angle that is calculated more frequently (perhaps in every loop) by subtracting the relative roll angle generated from a linear roll dynamics of a vehicle (see U.S. Pat. No. 6,556,908 which is incorporated by reference herein), from the calculated global roll angle (as one in U.S. Pat. No. 6,631,317 which is incorporated by reference herein). If all things were slowly changing without drifts, errors or the like, the linear bank angle and reference road bank angle terms would be equivalent.

During an event causing the vehicle to roll, the vehicle body is subject to a roll moment due to the coupling of the lateral tire force and the lateral acceleration applied to the center of gravity of vehicle body. This roll moment causes suspension height variation, which in turn results in a vehicle relative roll angle (also called chassis roll angle or suspension roll angle). The relative roll angle is used as an input to the activation criteria and to construct the feedback brake pressure command for RSC function, since it captures the relative roll between the vehicle body and the axle. The sum of such a chassis roll angle and the roll angle between wheel axle and the road surface (called wheel departure angle) provides the roll angle between the vehicle body and the average road surface, which is feeding back to the RSC module.

Figure 4:
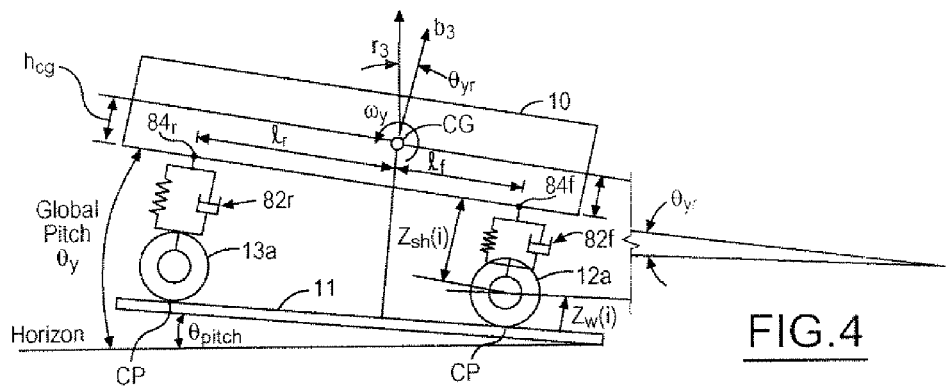
FIG. 4 is a side view of an automotive vehicle illustrating various variables thereon.
Figure 5:
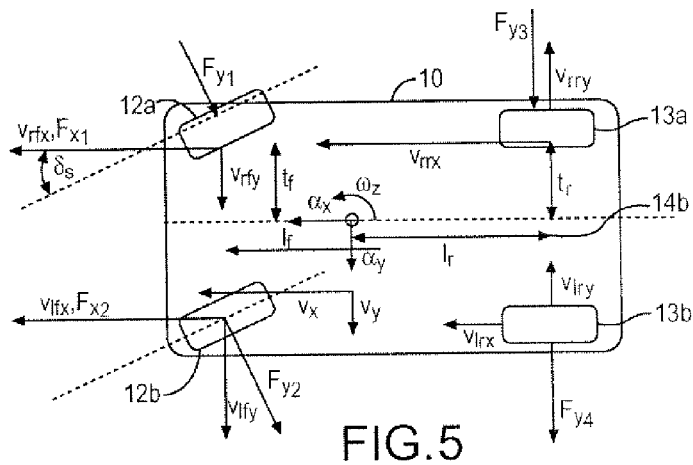
FIG. 5 is a top view of a vehicle according to the present invention.

Referring now to FIGS. 4 and 5, an automotive vehicle 10 is illustrated with various parameters illustrated thereon. The side view of automotive vehicle 10 is illustrated. A front suspension 82 and a rear suspension 82r are illustrated. The suspensions are coupled to the body at a respective suspension point 84f, 84r. The distance from the suspension point 84f to the center of the wheel is labeled $z_{sh}$. The distance from the center of gravity CG to the front suspension is labeled as $b_f$. The distance from the CG to the rear suspension point 84r is labeled as $b_r$. The vertical distance between the center of gravity and the suspension point are labeled respectively as $h_f$ and $h_r$. A portion of the body axis $b_3$ and the road axis $r_3$ are illustrated. The angle therebetween is the relative pitch angle $\theta_{yr}$. The rolling radius of the tire is labeled as $z_w$.

Referring specifically now to FIG. 5, a top view of vehicle 10. Lateral and longitudinal velocities of the center of gravity are denoted as $v_x$ and $v_y$, a yaw angular rate is denoted as $\omega_z$, a front wheel steering angle is denoted as $\delta_s$, lateral acceleration is represented by $a_y$, and longitudinal acceleration is represented by $a_x$. Also illustrated is the front track width $t_f$ and rear track width $t_r$. That is, the track widths are half the track widths from the center line or center of gravity of the vehicle to the center of the tire. Rear axle 14b extends between the rear wheels 13a, 13b. Various calculations may be performed relative to the rear axles of 14b.

Figure 6:
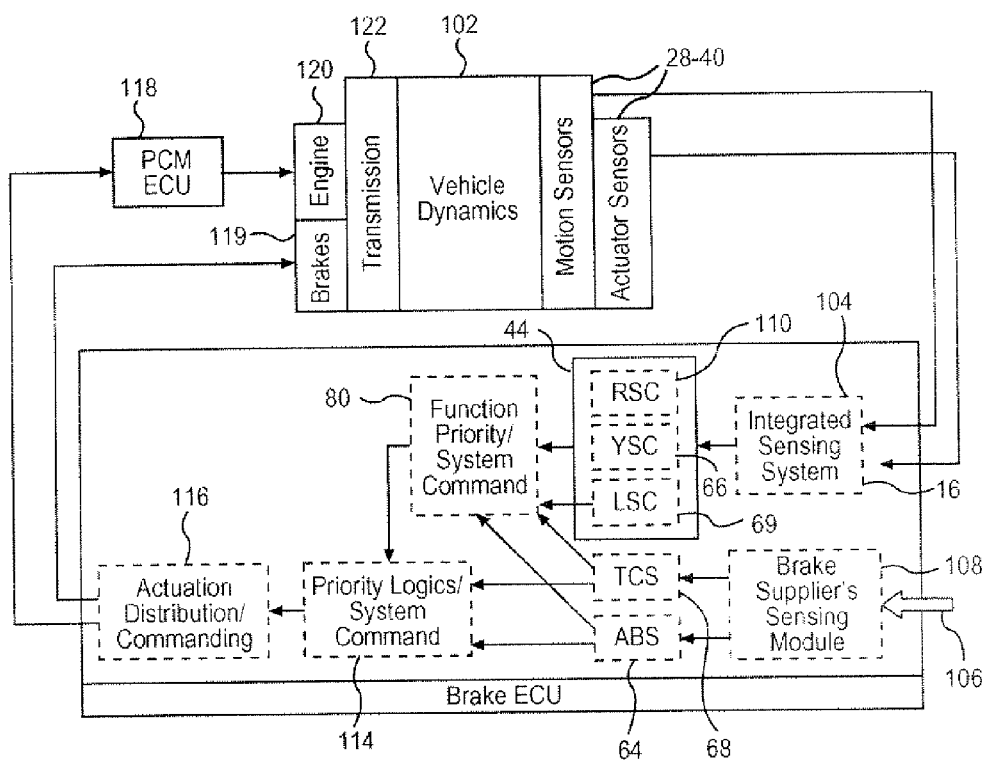
FIG. 6 is a detailed block diagrammatic view of a controller according to the present invention.

Referring now to FIG. 6, the interrelationship among the various units in a controlled vehicle dynamics is shown. The vehicle dynamics is represented by the module 102. The vehicle dynamics includes the angular and translation movements of the vehicle. The motion and actuation sensors 28-40 generate signals corresponding to the vehicle dynamics and the actions of the various actuators. The sensors are fed into the ISS unit 104. The sensor signals and the calculated signals from a system other than ISS (for example, the brake supplier's own brake control computations) 106 may be fed into to sensing module 108. The ISS unit is coupled to the ISCS unit 44 and may specifically be coupled to but not limited to the RSC function module 110 and a YSC function module 66. A function priority system command 80 may also be included. The output of the TCS module 68 and the ABS module 64 may be coupled to priority logic system command 114, which in turn is coupled to the actuation distribution and commanding block 116. The actuation distribution commanding block 116 is coupled to the powertrain control ECU 118 and to the brakes 119. The powertrain control module 118 may be coupled to the engine 120 and transmission 122. The actuation of the engine, the brakes and the transmission may affect the vehicle dynamics 102, which in turn is sensed by the various sensors. Thus, as can be seen, a continuous loop of sensing and controlling with respect to the vehicle dynamics is illustrated.

Figure 7:
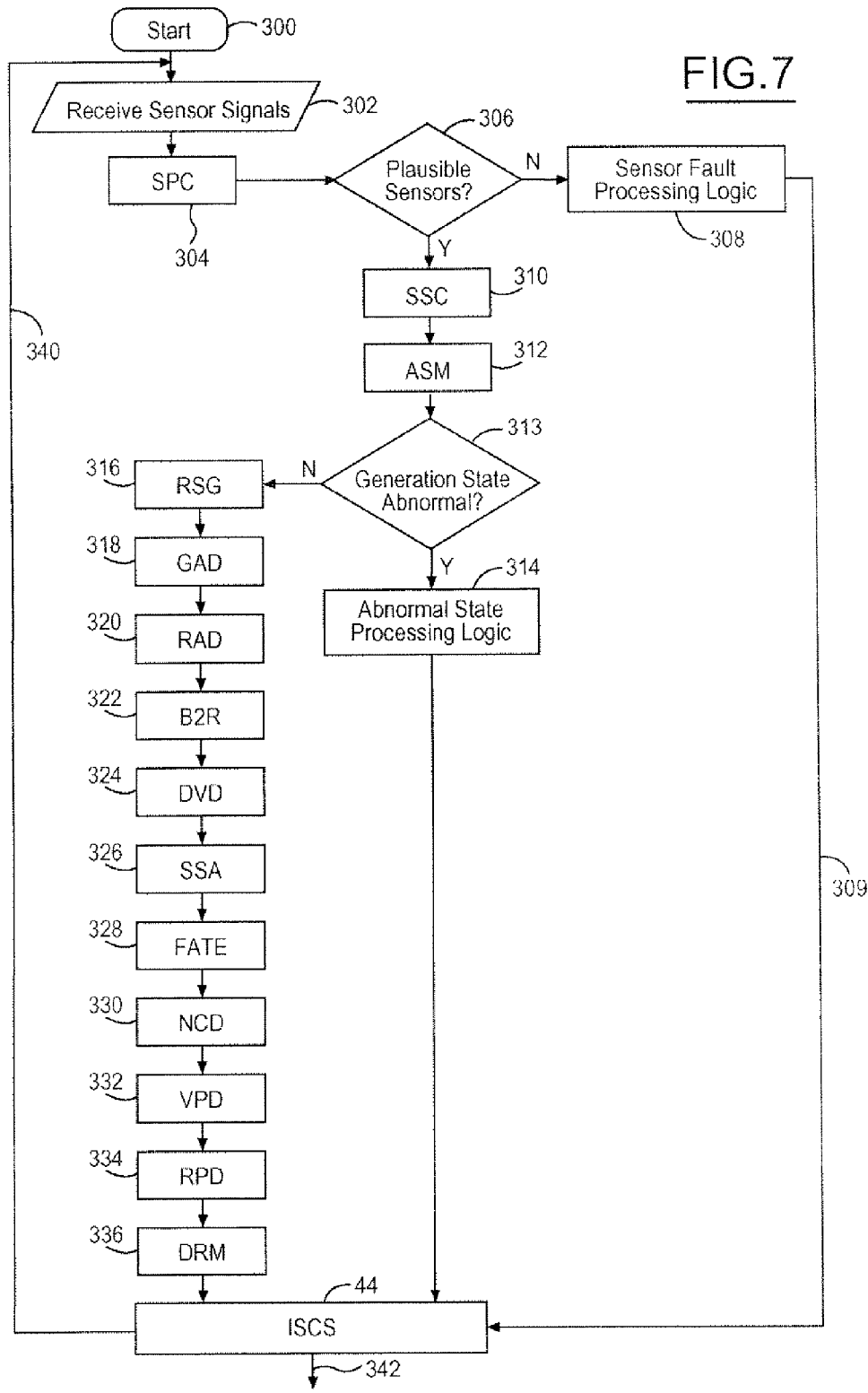
FIG. 7 is a flow chart illustrating a method of controlling the vehicle according to the present invention.

Referring now to FIG. 7, further detail of the operation ISS unit 26 is illustrated. The various computations in the ISS unit begin in start step 300. In step 302, signals from the various sensors are received. The sensor electronics usually provide an indication of the quality of the sensor signal sent out from a specific sensor and the environmental temperature around the sensors may also be provided. Built-in self-test of the sensors may also be conducted through the sensor electronics. In step 302, the signals from various sensors and sensor electronics are received. In this step, some extra actions other than "receiving" may be conducted. For example, the sensor signals are monitored for electric failures that may include communication failures, wiring failures and power supply failures. The communication failures may be due to a defective CAN hardware device, high frequency interference, CAN bus off events, missing CAN message from the sensor electronics, too high CAN load, wrong CAN controller configuration, and the like. The wiring failures might be due to interruptions, short circuit, electronics interference and leakage. The power supply failures might be due to short circuit to ground or to the wrong voltage, low voltage of the power supply. The sensor signals are also monitored for sudden changes and for out-of range monitoring. A sudden signal change with very high change rate might be a good indication of electronic failure of the sensor.

In step 304, the plausibility of the sensors is determined in the sensor plausibility check module (SPC). The main focus of SPC is on sensor defects, mechanical failures, or an implausible operation content. For example, a loose sensor might have certain implausible sensor (vibration) content which does not match the vehicle's motion; a sensor might be mounted incorrectly on the vehicle; the sensor electronics is gradually degraded (e.g., electronics component aging, electronic wiring aging) that cannot be detected through electronic monitoring). In all these cases, the overall vehicle dynamics behavior is checked to determine if certain sensor signals are plausible. For example, a roll rate plausibility check is conducted by comparing the roll rate sensor value with an roll rate estimation based on sensor signals other than roll rate such as the lateral acceleration, the yaw rate, the wheel speed and the steering wheel signals; a yaw rate plausibility check is conducted by comparing the yaw rate sensor value with an estimated yaw rate value based on the steering wheel angle, the lateral acceleration and wheel speed signals.

In step 306, if at least one sensor is not plausible, step 308 is executed in which sensor fault-processing logic is performed. The plausibility flags are set and saved in an accessible memory. A reduced model computation will be conducted and a partial function control will be determined. The info from the sensor fault processing logic will be fed to the ISCS unit 44 through the signal flow 309.

In step 310, sensor signals are compensated in the sensor signal compensation unit SSC. SSC will conduct sensor zeropoint offset compensation, sensor signal drift (for example, due to ambient temperature change) compensation), the sensor noise compensation, etc. The sensor mounting error such as sensor misalignments (see U.S. Pat. No. 6,782,315) might also be computed at this module.

In step 312, the abnormal operation states of the vehicle subsystems are monitored in the abnormal state monitoring module ASH. The abnormal states of the vehicle might be a flat tire or a tire with significant inflation pressure drop, a significant loading bias (such as a full trunk loading in a truck or a large roof loading in a SUV), off-shelf wheels, extreme wear of the brake pads, the imbalanced wheel (see U.S. Pat. No. 6,834,222). In step 313, if there are abnormal states presented, the abnormal state processing unit is conducted in step 314. The abnormal state processing logic involves assessing the severity of the abnormal states in terms of influence of the ISCS functions. If the abnormal operation states are not critical, then certain compensations of the involved signals will be compensated and the control function in ISCS will be continued. For example, if ASH detects one of the tires has a large tire pressure drop (but still above the threshold for a flat tire), the wheel's rolling radius will be learned and the wheel speed of that wheel will be compensated for by the learned rolling radius. The same is true for large size tires, spare tire, roof loading and trunk loading. If the abnormal states are critical such as in a flat tire case, the normal vehicle function like ISCS will be partially or completely shut off.

If there are no abnormal states detected in step 313, the system proceeds to step 316 to compute the reference signals which will be used in reference signal generator RSG (see U.S. Pat. No. 7,010,409). Notice that the variables calculated in RSG may be used by various functional units such as SPC, GAD, DVD, etc.

In step 318, the vehicle body's roll and pitch attitudes with respect to the sea level are calculated in GAD module. Although the engineering definition of the vehicle body's roll and pitch attitudes are pretty obvious (which are simultaneously measured just like in the previous definitions of the road bank and slope), there are no mathematical characterizations existed. Mathematically, Euler used sequential rotation to define the angular distance between different frame systems. If the longitudinal axis is used for the roll axis, and lateral axis for the pitch axis, then the Euler angles along those two axes are called the roll and pitch Euler angles respectively. Experimentally, the engineering definition (simultaneous measurement) of the vehicle body's global roll and pitch angles are very close to the Euler attitudes (sequential rotational measurement) and the differences are negligible. For this reason, the roll and pitch angles defined here are interchangeable with the Euler angles.

The Euler angles of the sensor cluster with respect to the sea level can be related to the roll, pitch and yaw angular rate sensor signals through the following coupled kinematics $$\dot{\theta}_{sx} = \omega_{sx} + [\omega_{sy} \sin(\theta_{sx}) + \omega_{sz} \cos(\theta_{sx})] \tan(\theta_{sy})$$

$$\dot{\theta}_{sy} = \omega_{sy} \cos(\theta_{sx}) - \omega_{sz} \sin(\theta_{sx}) \quad (3)$$

The relationship depicted above reveals complicated non-linear functions and it indicates that a simple integration of the roll rate could provide accurate information about the roll attitude only if both the pitch and yaw rate are negligible, which means the vehicle is dominated by roll motion; the roll attitude angle and yaw rate are negligible, the pitch attitude is limited; and, the pitch attitude angle is negligible with non-extreme pitch and yaw rates.

Similarly, the simple integration of the pitch rate could lead to accurate prediction of the pitch attitude angle if the roll attitude angle is negligible and the yaw rate is not extremely large. If the acceleration projected from the sensor frame to the vehicle body frame is defined as $a_{bx}$, $a_{by}$, the vehicle directional velocities measured on the vehicle body frame as $v_{bx}$, $v_{by}$, and the attitudes of the vehicle body with respect to the sea level as $\theta_{bx}$, $\theta_{by}$, then the following equations 4 hold.

$$\dot{v}_{bx} = a_{bx} + \omega_{bz} v_{by} + g \sin \theta_{by}$$

$$\dot{v}_{by} = a_{by} - \omega_{bz} v_{bx} - g \sin \theta_{bx} \cos \theta_{by} \quad (4)$$

In step 320, the vehicle body's relative attitudes with respect to its axles or the moving road frame are calculated. Those attitudes might be computed as in U.S. Pat. Nos. 6,556,908, 6,684,140, and 6,631,317.

In step 322, the signals measured along the sensor frames are transformed to signals along the moving road frames in the B2R module. If an IMU sensor cluster is used, the sensor signals might need to be compensated for frame different. For example, the sensor signals are meant to be along the sensor frame directions are not necessary along the vehicle body frame directions or the directions of control interests such as the moving road frames. The angular differences between different frames can be mathematically characterized using Euler transformations and using Euler angles. The Euler angles are defined as the sequential rotation along an axis to move one frame system to another frame system. When the Euler angle between the sensor frame $s_1 s_2 s_3$ and the body frame $b_1 b_2 b_3$ is $\Delta\theta_x$, $\Delta\theta_y$, $\Delta\theta_z$, then the angular rates and accelerations of the vehicle body defined along the body-fixed frame $b_1 b_2 b_3$ but at the sensor location may be calculated using the following matrix computation $$\begin{bmatrix} \omega_{bx} \\ \omega_{by} \\ \omega_{bz} \end{bmatrix} = E(\Delta\theta_z, \Delta\theta_y, \Delta\theta_x) \begin{bmatrix} \omega_{sx} \\ \omega_{sy} \\ \omega_{sz} \end{bmatrix} \quad (5)$$

$$\begin{bmatrix} a_{bx} \\ a_{by} \\ a_{bz} \end{bmatrix} = E(\Delta\theta_z, \Delta\theta_y, \Delta\theta_x) \begin{bmatrix} a_{sx} \\ a_{sy} \\ a_{sz} \end{bmatrix}$$

where the matrix $E(\bullet,\bullet,\bullet)$ is defined as the following for three Euler angles $\theta_3$, $\theta_2$, $\theta_1$ $$E(\theta_3, \theta_2, \theta_1) = \begin{bmatrix} \cos\theta_3\cos\theta_2 & \cos\theta_3\sin\theta_2\sin\theta_1 - \sin\theta_3\cos\theta_1 & \cos\theta_3\sin\theta_2\cos\theta_1 + \sin\theta_3\sin\theta_1 \\ \sin\theta_3\cos\theta_2 & \cos\theta_3\cos\theta_1 + \sin\theta_3\sin\theta_2\sin\theta_1 & \sin\theta_3\sin\theta_2\cos\theta_1 - \cos\theta_3\sin\theta_1 \\ -\sin\theta_2 & \cos\theta_2\sin\theta_1 & \cos\theta_2\cos\theta_1 \end{bmatrix}$$

Notice that the difference between the sensor frame and the body frame is mainly due to the sensor mounting errors. The sensor cluster mounting direction errors may be obtained by converting the simultaneously measured distances at the fixed points among the two frame systems to angular distance as in the definition of the moving road surface before. Mathematically, such a simultaneous measurement is different from the sequential definition of the Euler angles. However the differences between those two measurements are not significant. For this reason, the $\Delta\theta_x$, $\Delta\theta_y$, $\Delta\theta_z$ used in this invention is interchangeable with the engineering terminology such as the roll misalignment, pitch misalignment and yaw misalignment. U.S. Pat. No. 6,782,315 provides a method for determining $\Delta\theta_x$, $\Delta\theta_y$, $\Delta\theta_z$. If the vehicle body motion signals projected along the moving road frame is of interest, a further Euler transformation can be conducted. When the engineering roll angle between the vehicle body and the axle is $\theta_{xr}$ (which can be defined by using the suspension height differences between the left and right sides of the wheels and which is the same as the aforementioned relative or chassis roll angle, see U.S. Pat. Nos. 6,556,908 and 6,684,140), the engineering pitch angle between the vehicle body and the axle is $\theta_{yr}$ (which can be defined by using the suspension height differences between the front and rear axles and which is the same as the aforementioned relative or chassis pitch angle, see U.S. Pat. Nos. 6,556,908 and 6,684,140), the engineering roll angle between the axle and the moving road frame is $\theta_{wda}$ (which is non-zero only if the vehicle is experiencing an imminent rollover, see US patent publications 2004/0064236 and 2004/0162654), then the vehicle body's motion variables $\omega_{mrfx}$, $\omega_{mrfy}$, $\omega_{mrfz}$, $a_{mrfx}$, $a_{mrfy}$, $a_{mrfz}$ along the moving road frames may be computed as in the following $$\begin{bmatrix} \omega_{mrfx} \\ \omega_{mrfy} \\ \omega_{mrfz} \end{bmatrix} = E(0, \theta_{yr}, \theta_{xr}, \theta_{wda}) \begin{bmatrix} \omega_{bx} \\ \omega_{by} \\ \omega_{bz} \end{bmatrix} \quad (6)$$

$$\begin{bmatrix} a_{mrfx} \\ a_{mrfy} \\ a_{mrfz} \end{bmatrix} = E(0, \theta_{yr}, \theta_{xr}, \theta_{wda}) \begin{bmatrix} a_{bx} \\ a_{by} \\ a_{bz} \end{bmatrix}$$

By using the features of the Euler transformation, $\omega_{mrfx}$, $\omega_{mrfy}$, $\omega_{mrfz}$, $a_{mrfx}$, $a_{mrfy}$, $a_{mrfz}$ can be directly related to the sensor signals as in the following $$\begin{bmatrix} \omega_{mrfx} \\ \omega_{mrfy} \\ \omega_{mrfz} \end{bmatrix} = E(\Delta\theta_z, \Delta\theta_y + \theta_{yr}, \Delta\theta_x + \theta_{xr} + \theta_{wda}) \begin{bmatrix} \omega_{bx} \\ \omega_{by} \\ \omega_{bz} \end{bmatrix} \quad (7)$$

$$\begin{bmatrix} a_{mrfx} \\ a_{mrfy} \\ a_{mrfz} \end{bmatrix} = E(\Delta\theta_z, \Delta\theta_y + \theta_{yr}, \Delta\theta_x + \theta_{xr} + \theta_{wda}) \begin{bmatrix} a_{bx} \\ a_{by} \\ a_{bz} \end{bmatrix}$$

Notice that in many cases, the motion variables such as accelerations at locations other than the sensor location are of interests. For example, in this invention disclosure, the vehicle body accelerations $a_{mrfrax}$, $a_{mrfray}$, $a_{mrfraz}$ at the vehicle rear axle location are of interests for lateral stability control and they can be further transformed according to the following computations:

$$a_{mrfrax} = a_{mrfx} + p_{xsl2ra}(\omega_{mrfy}^2 + \omega_{mrfz}^2)$$

$$a_{mrfray} = a_{mrfy} - p_{xsl2ra}(\dot{\omega}_{mrfz} + \omega_{mrfx}\omega_{mrfy})$$

$$a_{mrfraz} = a_{mrfz} + p_{xsl2ra}(\dot{\omega}_{mrfy} - \omega_{mrfx}\omega_{mrfz}) \quad (8)$$

where $p_{xsl2ra}$ is the distance between the IMU sensor location and the rear axle in the longitudinal direction. The sensor is assumed to be located on the center line of the vehicle body. If such an assumption is not true, extra terms will need to be added to the above computation.

In 324, the vehicle's directional velocities such as the vehicle longitudinal velocity, lateral velocity, are calculated. The detailed description about such computations will be provided below.

In step 326, the vehicle's sideslip angle is computed. The detailed description about such a computation will be provided below.

In 328, the lateral and longitudinal tire forces, braking torques and driving torques applied to the wheels are computed in the FATE unit by using the available motion sensor information such as body motion variables from IMU sensors, wheel speed sensors and actuator specific information such as the caliper brake pressure and the engine axle torque.

In 330, the normal loading from the road applied to the wheels at the wheel contact patches are computed in the NLD unit.

In 332, the vehicle's operational parameters such as the vehicle roll gradient, the vehicle loading and mass, the vehicle's c.g. height, etc., are determined in the VPD unit.

In 334, the driving road parameters such as the road bank, slope, friction level, etc., are determined in the RPD unit. Some of those computations might be found in U.S. Pat. No. 6,718,248 and US patent publication 2004/0030475.

In 336, the driver's driving references are determined based on the driver reference model DRM. One of the DRMs might be a bicycle model used in finding the vehicle yaw reference, which is used to determine the driver's intension. Notice that the tire forces reside on the moving road plane, hence a driving reference model using tire force balancing must work everything in the moving road frame. Let the desired motion variables of the vehicle body at the vehicle body center of gravity location but projected to the moving road frame as $a_{mrfcgxd}$, $a_{mrfcgyd}$, $v_{mrfcgyd}$, $\omega_{mrfcgzd}$ for longitudinal acceleration, lateral acceleration, lateral velocity and yaw rate, satisfy the following relationship based on a four-wheel vehicle model (here only the front wheel steering case is presented, for rear wheel steering and four wheel steering case, similar equations may be obtained)

$$I_z \dot{\omega}_{mrfcgzd} = F_{x1} l \cos(\gamma + \delta_s) - F_{x2} l \cos(\gamma - \delta_s) + \quad (9)$$
$$(F_{x3} - F_{x4})t_r + F_{y1} l \sin(\gamma + \delta_s) + F_{y2} l \sin(\gamma - \delta_s) - F_{yr} l_r$$
$$M_t a_{mrfcgxd} = (F_{x1} + F_{x2})\cos(\delta_s) + F_{x3} + F_{x4} - (F_{y1} + F_{y2})\sin(\delta_s)$$
$$M_t a_{mrfcgyd} = (F_{x1} + F_{x2})\sin(\delta_s) + (F_{y1} + F_{y2})\cos(\delta_s) + F_{yr}$$

where $l = \sqrt{t_f^2 + l_f^2}$, $\gamma = a\tan(t_f/l_f)$. $M_t$ is the total vehicle mass; $a_{mrfcgxd}$ and $a_{mrfcgyd}$ are the desired vehicle c.g. longitudinal and lateral acceleration projected on the moving road frame; $\delta_x$ is the wheel steering angle, which may be calculated through the driver's steering wheel angle and the known steering gear ratio; $F_{y1}$, $F_{y2}$ and $F_{yr}$ are the lateral forces applied to the front-left, front-right, rear axle (sum of the lateral forces of the rear-left and the rear right wheels) from the road $F_{x1}$, $F_{x2}$, $F_{x3}$, $F_{x4}$ are the four longitudinal tire forces at the front-left, the front-right, the rear-left and the rear-right wheels. If the desired front wheels' sideslip angle is $\alpha_{mrffd}$ and the rear wheels' sideslip angle is $\alpha_{mrfrd}$ (both of them are defined on the moving road plane), then the desired vehicle sideslip angle, the steering inputs and the desired yaw rate are related with each other as in the following:

$$\alpha_{mrffd} = \frac{v_{mrfcgyd}}{v_{mrfcgx}} + \frac{l_f \omega_{mrfcgzd}}{v_{mrfcgx}} - \delta_s \quad (10)$$

$$\alpha_{mrfrd} = \frac{v_{mrfcgyd}}{v_{mrfcgx}} - \frac{l_r \omega_{mrfcgzd}}{v_{mrfcgx}}$$

Using those wheel sideslip angles, the lateral tire forces may be expressed as $$F_{y1} = c_1 \alpha_{mrffd}$$

$$F_{y2} = c_2 \alpha_{mrffd}$$

$$F_{yr} = c_r \alpha_{mrfrd} \quad (11)$$

where $c_i$ is the cornering stiffness of the vehicle and by using those forces, then $$I_z \dot{\omega}_{mrfcgzd} = a(\delta_s, v_{mrfcgx})\omega_{mrfcgzd} + b(\delta_s, v_{mrfcgx})v_{mrfcgyd} + c(\delta_s)F_x$$

$$M_t \dot{v}_{mefcgyd} = e(\delta_s, v_{mrfcgx})\omega_{mrfcgzd} + f(\delta_s, v_{mrfcgx})$$
$$v_{mefcgyd} + g(\delta_s)F_x + h(\theta_{mrfx}) \quad (12)$$

The above defined desired yaw rate and the desired lateral velocity needs to satisfy the following equation for longitudinal direction force balancing $$y(F_x, \delta_s, a_{mrfcgx}) = c_f x(v_{mrfcgyd}, \omega_{mrfcgzd}, v_{mrfcgx}, \delta_s) \quad (13)$$

where $c_f = c_1 + c_2$, and functions $y(\cdot)$ and $x(\cdot)$ may be expressed as the following $$x = \left(\frac{v_{mrfcgyd}}{v_{mrfcgx}} + \frac{l_f \omega_{mrfcgzd}}{v_{mrfcgx}} - \delta_s\right)\sin(\delta_s) \quad (14)$$

$$y = (F_{x1} + F_{x2})\cos(\delta_s) + F_{x3} + F_{x4} - M_1 a_{mrfcgx}$$

and this equation may be used to adaptively estimate the average cornering stiffness experienced by the vehicle under the desired motion as in the following iterative scheme $$c_f(k+1) = c_f(k) - \rho w(k+1)[y(k) - c_f(k)x(k)]\Delta T \quad (15)$$

where $\rho$ is the adaptive gain and $\Delta T$ is the sampling time of the computation. Notice that in the above DRM computation, the inputs are the vehicle's longitudinal velocity projected on the moving road frame but computed at the c.g. of the vehicle, the measured longitudinal acceleration of the vehicle body projected on the moving road frame at c.g. of the vehicle body, the driver's steering wheel inputs. Those variables are directly related to the sensor measurements. The outputs are the desired yaw rate $\omega_{mrfcgzd}$, the desired lateral velocity $v_{mrfcgyd}$, the updated tire cornering stiffness $c_f$.

All the above calculated signals are fed into the ICSC module 44 and the arbitrated or prioritized or overridden control commands are then sent to the ECU or hardware electronics of the available actuators through the control signal represented by 342. The specific applications using those signals will be discussed in the following. The ISCS according to a first embodiment of the present invention intends to use differential braking to keep the vehicle moving in stable conditions regardless the driver's inputs or the road surface conditions. The instability of the vehicle during a driver-initiated maneuver could be in roll direction (such as a RSC event), yaw direction (such as a YSC event), lateral direction (such as a LSC event), or any combination of RSC, YSC and LSC events.

For the LSC events case, the lateral instability of the vehicle happens when its lateral excursion relative to the driver's desired path is divergent. For turning purpose, the vehicle has to have certain (absolute) lateral excursion (especially in the front axle), which is defined through the driver's steering input. Even if the driver is requesting a large steering input (which means a large absolute lateral excursion), the vehicle could still be laterally stable (since the vehicle's relative lateral excursion could be small). During lateral instability, the velocity of this relative lateral excursion is non-zero and without crossing zero for a significant amount of time (for example, for more than 1 or 2 seconds). Mathematically, when a vehicle is negotiating a path, the total vehicle's velocity coincides with the tangent direction of the path and the vehicle is laterally stable. On the other hand, if the vehicle's total velocity largely deviates from the tangent direction of the path defined by the driver's steering input, the vehicle is likely in the laterally instable mode. Considering the rear wheel does not have any steering angle (for a front wheel steering vehicle), when the center of the rear axle negotiates the path, its total velocity must be along the longitudinal direction of the moving road frame. For this reason, the angle between the total velocity of the center of the rear axle and the vehicle's longitudinal direction are used as the measurements for the vehicle's lateral instability. The rear location is used in the invention as the location to define the vehicle's lateral instability. Since the vehicle's path always resides on the road surface or the moving road frame, the lateral instability also needs to use the angle between the total velocity of the rear axle projected on the moving road frame and the longitudinal direction of the moving road frame. Such an angle is a variation of the normally used sideslip angle at the rear and is set forth as the variable $\beta_{LSC}$. $\beta_{LSC}$ is defined as in the following:

$$\beta_{LSC} = \beta_{mrfra} = \tan^{-1}\left(\frac{v_{mrfray}}{v_{mrfrax}}\right) \quad (16)$$

Ideally, the desired value for $\beta_{LSC}$ is zero. For practical implementation purpose, a non-zero desired value $\beta_{LSCd}$ is used. The error signal $$\beta_{LSCe} = \beta_{LSC} - \beta_{LSCd} \quad (17)$$

is used as a feedback signal to compute the control command for conducting LSC control. Let $\beta_{db1}$ and $\beta_{db2}$ be the two dead-bands for compute the torques necessary for counteracting the vehicle's lateral instability. The proportional portion of the feedback torque $M_{LSCP}$ can be computed as in the following $$\begin{aligned}
&\text{if during oversteer condition}\\
&\quad \text{if } \beta_{LSCe} \geq \beta_{db1} \text{ and } \beta_{LSCe} \leq \beta_{db2}\\
&\quad\quad M_{LSCP} = 0\\
&\quad \text{else if } \beta_{LSCe} < \beta_{db1}\\
&\quad\quad M_{LSCP} = G_{SP}(\beta_{db1} - \beta_{LSCe})\\
&\quad \text{else}\\
&\quad\quad M_{LSCP} = G_{SP}(\beta_{db2} - \beta_{LSCe})\\
&\text{end}
\end{aligned} \quad (18)$$

where $G_{SP}$ is a control gain which could be an adaptive gain based on the vehicle's dynamics. The over-steer condition of the vehicle can be determined based on the steering wheel information, the lateral acceleration information, the yaw rate information, the yaw error information, the sideslip angle information, etc. One example of such an over-steer condition can be determined from the YSC yaw rate error. The variable $d\beta_{LSCe}$ is the derivative of $\beta_{LSCe}$, which can be directly computed from $\beta_{LSCe}$ or from the other signals. The variables $d\beta_{db1}$ and $d\beta_{db2}$ are the two dead-bands. The derivative portion of the feedback torque $M_{LSCD}$ can be computed as in the following:

$$\begin{aligned}
&\text{if during oversteer condition}\\
&\quad \text{if } d\beta_{LSCe} \geq d\beta_{db1} \text{ and } d\beta_{LSCe} \leq d\beta_{db2}\\
&\quad\quad M_{LSCD} = 0\\
&\quad \text{else if } d\beta_{LSCe} < d\beta_{db1}\\
&\quad\quad M_{LSCD} = G_{SD}(d\beta_{db1} - d\beta_{LSCe})\\
&\quad \text{else}\\
&\quad\quad M_{LSCD} = G_{SD}(d\beta_{LSCe} - d\beta_{LSCe})\\
&\text{end}
\end{aligned} \quad (19)$$

where $G_{SD}$ is a control gain which could be an adaptive gain based on the vehicle's dynamics. The under-steer condition of the vehicle can be determined based on the steering wheel information, the lateral acceleration information, the yaw rate information, the yaw error information, the sideslip angle information and the like. One example of an under-steer condition may be determined from the YSC yaw rate error. The final feedback torque $M_{LSC}$ for LSC control can be obtained through the following blending $$M_{LSC} = \lambda_1 M_{LSCP} + \lambda_2 M_{LSCD} \qquad (20)$$

where the weights $\lambda_1, \lambda_2$ are two positive numbers less than 1 which weight the relative importance of the proportional term and the derivative term in the final feedback torque. In certain driving conditions, a constraint may be set forth as $\lambda_1 + \lambda_2 = 1$.

The YSC yaw moment demand $M_{YSC}$ may be generated through yaw rate error feedback control. When $\omega_{mrfz}$ is the desired or target yaw rate which is determined in DRM module, $\omega_{mrfz}$ is the vehicle body's yaw rate but projected on the moving road frame. Then the vehicle yaw rate error can be calculated as $$\omega_{mrfze} = \omega_{mrfz} - \omega_{mrfcgzd} \qquad (21)$$

If $\omega_{mrfze} > \omega_{zosthreshold} > 0$ together with the sign of the vehicle's sideslip angle matching the turning direction of the vehicle, where $\omega_{zosthreshold}$ is a variable that reflects the threshold of the vehicle's over-steer characteristics, the vehicle is likely to be in an over-steer condition, i.e., the vehicle's yaw response exceeds the driver's intention determined from the driver's steering wheel angle. Based on this, the following counteracting torque applied to the yaw direction of the vehicle may be computed so as to reduce the discrepancy between the actual yaw rate and the desired yaw rate $$\text{if } (\omega_{mrfe} - \omega_{zosthreshold} \geq \omega_{os} \text{ \&\& } a_{mrfray} \geq a_{yos} \text{ \&\& } \beta_{mrfra} \leq -\beta_{os}$$
$$\| \omega_{zosthreshold} - \omega_{mrfe} \geq \omega_{os} \text{ \&\& } a_{mrfray} \leq -a_{yos} 0 \text{ \&\& } \beta_{mrfra} \geq \beta_{os})$$
$$M_{YSC} = G_{OSYP}(\omega_{zosthreshold} - \omega_{mrfe}) + G_{OSYD}(d\omega_{zosthreshold} - \dot{\omega}_{mrfe}); \qquad (22)$$
else
$$M_{YSC} = 0$$

where $\omega_{os}, a_{yos}, \beta_{os}$ are the dead-bands for the yaw rate error beyond threshold $\omega_{zosthreshold}$ the dead-band for the lateral acceleration, the dead-band for the sideslip angle at the rear axle; $d\omega_{zosthreshold}, \dot{\omega}_{mrfe}$ are the derivatives of the threshold $\omega_{zosthreshold}$ and the yaw rate error; $G_{YPOS}, G_{YDOS}$ are feedback control gains which are functions of the driving conditions. $M_{OS}$ is the control torque along the yaw direction that tries to regulate the yaw error during over-steer condition.

If $\omega_{mrfze} < \omega_{zusthreshold} < 0$ with $\omega_{zusthreshold}$ together with the sign of the vehicle's sideslip angle matching the turning direction of the vehicle, where $\omega_{zusthreshold}$ is a variable that reflects the threshold of the vehicle's under-steer characteristics, the vehicle is likely to be in a under-steer characteristics, i.e, the vehicle's yaw response is below the driver's intension determined from the driver's steering wheel angle $$\text{f } (\omega_{mrfe} - \omega_{zosthreshold} \leq -\omega_{us} \text{ \&\& } a_{mrfray} \geq a_{yus}$$
$$\| \omega_{zosthreshold} - \omega_{mrfe} \leq \omega_{us} \text{ \&\& } a_{mrfray} \leq -a_{yus})$$
$$M_{US} = G_{YPUS}(\omega_{zosthreshold} - \omega_{mrfe}) + G_{YDUS}(d\omega_{zosthreshold} - \dot{\omega}_{mrfe}); \qquad (23)$$
else
$$M_{US} = 0$$

where $\omega_{us}, a_{yus}, \beta_{us}$ are the dead-bands for the yaw rate error beyond threshold $\omega_{zusthreshold}$, the dead-band for the lateral acceleration, the dead-band for the sideslip angle at the rear axle; $\omega_{zusthreshold}$ is the derivative of the threshold $\omega_{zusthreshold}$; $G_{YPUS}, G_{YDUS}$ are feedback control gains which are functions of the driving conditions. $M_{US}$ is the control torque along the yaw direction that tries to regulate the yaw error during under-steer condition.

The RSC control is an over-steer type of control. The RSC control command can be computed from the yaw torque based on the feedback signal of vehicle body-to-road roll angle. This torque may be set forth as $M_{RSC}$.

Since for the different functions, there are different computations for commanding the control torques applied to the vehicle's yaw direction through differential braking. Those control torques regulate different error signals such as the sideslip angle at the rear axle of the vehicle but projected on the moving road plane (for LSC) the yaw error of the vehicle along the normal direction of the moving road plane (for YSC) and the relative roll angle between the vehicle body and the moving plane (for RSC). There is a need to arbitrate or prioritize or integrate those different computations to achieve the optimized integrated stability control performance. For under-steer control, since there is only one control function (in YSC under-steer control), such an integration is not necessary. However, for over-steer control, such an integration is required. If $M_{OS}$ and $M_{US}$ are defined as the finally arbitrated over-steer control torque and the under-steer control torque, then one of such integration scheme can be summarized as in the following, where the weights $\gamma_1, \gamma_2$ and $\gamma_3$ are three positive numbers less than 1 that weight the relative importance among the three feedback torques:

if ($M_{RSC} > 0$ && $M_{LSC} > 0$ && $M_{YSC} > 0$ || $M_{RSC} < 0$ && $M_{LSC} < 0$ && $M_{YSC} < 0$)
{
  $M_{OS} = \gamma_1 M_{RSC} + \gamma_2 M_{LSC} + \gamma_3 M_{YSC}; M_{US} = 0;$
}
elseif ($|M_{RSC}| > p_{rsceth}$ && $|M_{LSC}| < p_{lsceth}$ && $|M_{YSC}| < p_{ysceth}$)
{
  $M_{OS} = M_{RSC}; M_{US} = 0;$
}
elseif ($|M_{RSC}| < p_{rsceth}$ && $|M_{LSC}| > p_{lsceth}$ && $|M_{YSC}| < p_{ysceth}$)
{
  $M_{OS} = M_{LSC}; M_{US} = 0;$
}
elseif ($|M_{RSC}| < p_{rsceth}$ && $|M_{LSC}| < p_{lsceth}$ && $|M_{YSC}| > p_{ysceth}$)
{
  $M_{OS} = M_{YSC}; M_{US} = 0;$
}
elseif ($|M_{RSC}| > p_{rsceth}$ && $|M_{LSC}| > p_{lsceth}$ && $|M_{YSC}| < p_{ysceth}$)

-continued $$
\begin{cases}
[M_{OS},i] = \max(|M_{YSC}|,|M_{LSC}|); M_{OS} = M_{OS}\text{sign}(M_i); M_{US} = 0; \\
\}\\
\text{elseif } (|M_{RSC}| > p_{rscth} \text{ \&\& } |M_{LSC}| < p_{lscth} \text{ \&\& } |M_{YSC}| > p_{yscth}) \\
\{\\
[M_{OS},i] = \max(|M_{RSC}|,|M_{YSC}|); M_{OS} = M_{OS}\text{sign}(M_i); M_{US} = 0; \\
\}\\
\text{elseif } (|M_{RSC}| < p_{rscth} \text{ \&\& } |M_{LSC}| > p_{lscth} \text{ \&\& } |M_{YSC}| > p_{yscth}) \\
\{\\
[M_{OS},i] = \max(|M_{LSC}|,|M_{YSC}|); M_{OS} = M_{OS}\text{sign}(M_i); M_{US} = 0; \\
\}\\
\text{else} \\
\{\\
[M_{OS},i] = \max(|M_{RSC}|,|M_{LSC}|,|M_{YSC}|); M_{OS} = M_{OS}\text{sign}(M_i); M_{US} = 0; \\
\}
\end{cases}
\quad (24)
$$

After the aforementioned torque $M_{OS}$ or $M_{US}$ has been computed, it may be realized by building or releasing braking pressure on selective wheels or wheel. Generally speaking, in over-steer case, the controlled wheel is the front outside wheel or both the front outside wheel and the rear outside wheel, i.e., the brake pressure modification is requested for the front outside wheel or for the outside wheels; in under-steer control, the controlled wheel is the rear inside wheel or both the inside wheels, i.e., brake pressure modification is requested for the rear inside wheel or for the inside wheels. Based on the aforementioned rule of thumb, various types of controls can be performed based on the various driving conditions. In the following discussion, a rear wheel driving vehicle is assumed and the similar consideration holds for front wheel driving or four wheel driving vehicles.

In the case of under-steering with throttle open, the engine torque is first reduced so as to regulate the under-steer yaw error. If the engine torque reduction is not enough to bring the vehicle's yaw error below certain threshold, the rear inside wheel is braked and the brake pressure amount is computed based on the yaw error feedback torque $M_{US}$. For example, the brake pressure for the inside rear wheel needs to generate the following longitudinal slip ratio $$\rho_{ir} = \frac{M_{US}}{t_r \kappa_{ir} N_{ir}} \quad (25)$$

where $\rho_{ir}$ is the longitudinal slip-ratio of the inside rear wheel, $t_r$ is the half track of the rear axle, $\kappa_{ir}$, $N_{ir}$ are the gain and the normal loading for the wheel at the inside rear location. If the requested inside rear wheel slip ratio $|\rho_{ir}| \geq \bar{\rho}$ with $\bar{\rho}$ being the allowed minimum slip ratio at the rear wheels to prevent the rear end to loose. In some cases, when the vehicle's sideslip angle $\beta_{LSC}$ is kept below certain threshold, both front inside and rear inside wheels might be applied brake pressure based on the following requested slip ratios $$\rho_{ir} = \bar{\rho}; \quad (26)$$
$$\rho_{if} = \frac{M_{US} - \bar{\rho} t_r \kappa_{if} N_{if}}{t_r \kappa_{if} N_{if}}$$

If after the above brake based under-steer control, the vehicle's under-steer yaw error is still big and the driver's steering input is still increasing, the vehicle might have significant tire lateral force saturation in the front wheels. In this case, the vehicle may be slowed down through additional braking. Such additional braking could be applied to all the four wheels. Since the vehicle's turning radius is proportional to the vehicle's speed, hence slowing down the vehicle is indirectly helping reduce the under-steer of the vehicle. Notice that whenever the vehicle sideslip angle is beyond certain threshold, the afore-mentioned under-steer control request will be zeroed out. If the turning-off is not quick enough to change the actual caliper pressure, both under-steer control and over-steer control might happen briefly together. If the brake pressure apply to two wheels at the same axle, $M_{US}$ might be realized through longitudinal force differential as in the following, the yaw moment demand is developed through the side-to-side deviation of the longitudinal slip ratio between the two wheels $$\Delta \rho = \frac{M_{US} - t_f(\kappa_1 N_1 \lambda_{fl} - \kappa_2 N_2 \lambda_{fl})}{t_f \kappa_2 N_2} \quad (27)$$

In the case of under-steering with vehicle coasting, then the brake pressure will be first applied to the rear inside wheel. If the under-steer yaw rate error cannot be significantly reduced, then a further increase of the brake pressure in the front inside wheel (as in 26)) will be conducted. If after the above brake based under-steer control, the vehicle's under-steer yaw error is still big enough, further braking will be applied to the outside wheels so as to further slow down the vehicle. Notice that whenever the vehicle sideslip angle is beyond certain threshold, the afore-mentioned under-steer control request will be zeroed out.

In the case of under-steering with driver braking, the braking pressure is sent to the front inside wheel and the rear inside wheel until ABS is activated. If the rear inside wheel enters ABS and the vehicle is still demanding large yaw error correction command, then part of the pressure for the rear inside wheel will be sent to the front inside wheel. If the front inside wheel enters ABS and the rear inside wheel is not in ABS and the yaw command is still high, part of the front inside wheel pressure will be redirected to the rear inside wheel. Notice that whenever the vehicle sideslip angle is beyond certain threshold, the afore-mentioned under-steer control request will be zeroed out. If such a turning-off is not quick enough to change the actual caliper pressure, both under-steer control and over-steer control might happen briefly together.

In the case of over-steering with throttle open, the engine torque reduction is also conducted and at the same time a brake pressure based on $M_{OS}$ is sent to the front outside wheel.

In the case of over-steering with vehicle coasting, a brake pressure based on $M_{OS}$ is sent to the front outside wheel.

In the case of over-steering with driver braking, the braking pressure is applied to the front outside wheel and the front outside wheel is allowed to lock so as to kill significant yaw error and sideslip angle.

In the case of over-steering with driver braking, applying pressure to the front outside wheel. If the front outside wheel is locked but the yaw command is still large, the rear inside wheel slip control is activated (reducing the rear inside wheel slip ratio so as to increase the lateral force at rear axle).

More detailed control scheme to realized the calculated feedback torque $M_{OS}$ and $M_{US}$ can be similarly developed based on the drivetrain configuration, etc.

The further details of the computation used in ISS will be provided here.

The kinematics used in the ISS unit can be described by the following equations for the body frame $$d\theta_{bx} = \omega_{bx} + [\omega_{by} \sin\theta_{bx} + \omega_{bz} \cos\theta_{bx}] \tan\theta_{by}$$

$$d\theta_{by} = \omega_{by} \cos\theta_{bx} - \omega_{bz} \sin\theta_{bx}$$

$$dv_{bx} = a_{bx} + \omega_{bz} v_{by} + g \sin\theta_{by}$$

$$dv_{bray} = a_{bray} - \omega_{bz} v_{bz} - g \sin\theta_{bx} \cos\theta_{by} \qquad (28)$$

where $v_{bray}$, $a_{bray}$ are the lateral velocity and acceleration at the rear axle location but projected on vehicle body-fixed frames. $d\theta_{bx}$, $d\theta_{by}$, $dv_{bx}$, $dv_{bray}$ are the variables whose theoretic values are the time derivatives of $\theta_{bx}$, $\theta_{by}$, $v_{bx}$, $v_{bray}$, but in reality due to sensor error or sensor uncertainties, they are not necessarily equal to $\dot\theta_{bx}$, $\dot\theta_{by}$, $\dot v_{bx}$, $\dot v_{bray}$. In the sensor frame, the above equations can be rewritten as $$d\theta_{sx} = \omega_{sx} + [\omega_{sy} \sin\theta_{sx} + \omega_{sz} \cos\theta_{sx}] \tan\theta_{sy}$$

$$d\theta_{sy} = \omega_{sy} \cos\theta_{sx} - \omega_{sz} \sin\theta_{sx}$$

$$dv_{sx} = a_{sx} + \omega_{sz} v_{sy} + g \sin\theta_{sy}$$

$$dv_{sray} = a_{sray} - \omega_{sz} v_{sx} - g \sin\theta_{sx} \cos\theta_{sy} \qquad (29)$$

In the moving road frame, the following equations are true $$d\theta_{mrfx} = \omega_{mrfx} + [\omega_{mrfy} \sin\theta_{mrfx} + \omega_{mrfz} \cos\theta_{mrfx}] \tan\theta_{mrfy}$$

$$d\theta_{mrfy} = \omega_{mrfy} \cos\theta_{mrfx} - \omega_{mrfz} \sin\theta_{mrfx}$$

$$dv_{mrfx} = a_{mrfx} + \omega_{mrfz} v_{mrfy} + g \sin\theta_{mrfy}$$

$$dv_{mrfray} = a_{mrfray} - \omega_{mrfz} v_{mrfx} - g \sin\theta_{mrfx} \cos\theta_{mrfy} \qquad (30)$$

In the following discussion, the details of directional velocity determination in ISS will be provided. First, the computation of the linear lateral velocity based on the bicycle model is performed.

Figure 8:
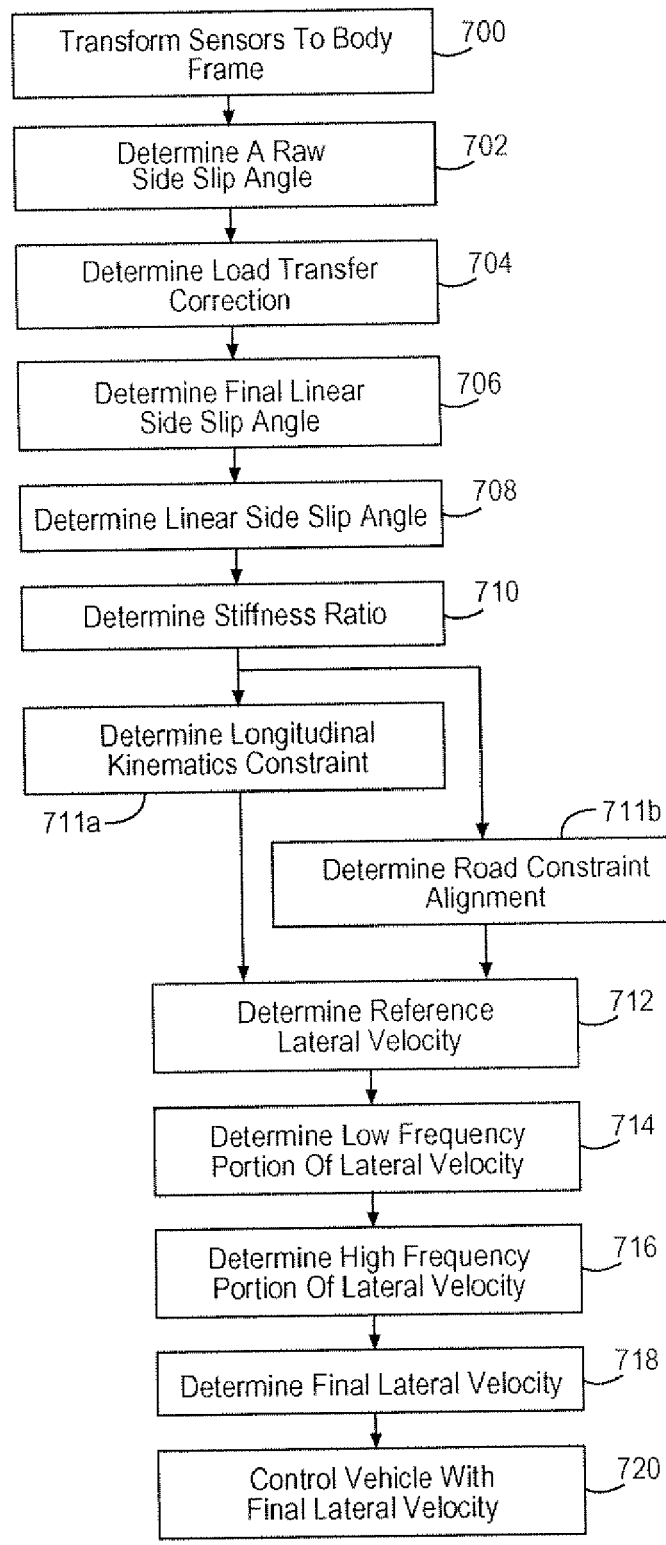
FIG. 8 is another method for determining the lateral velocity of the vehicle.

Referring now to FIG. 8, the traditional bicycle model may be used to determine the yaw and lateral dynamics of a vehicle. This may be performed using the following differential equations $$I_z \dot\omega_{mrfz} = b_f F_{mrff} \cos\delta - b_r F_{mrfr} - (I_y - I_x)\omega_{mrfy}\omega_{mrfx} + Y_z$$

$$M_t a_{mrfcgy} = F_{mrff} \cos\delta + F_{mrfr} \qquad (31)$$

where $F_{mrff}$ and $F_{mrfr}$ are the lateral forces applied to the front axle and rear axle through tires respectively; $Y_z$ is the yawing moment due to yaw stability control, which may be estimated based on the desired yaw stability command and the estimated road surface $\mu$; $I_x$, $I_y$, $I_z$ are the roll, pitch and yaw moments of inertia of the vehicle along the axes of the moving road frame which may be approximated by those in the vehicle body frame; $M_t$ is the vehicle total mass; $b_f$ is the distance from the vehicle center of gravity to the front axle; $b_r$ is the distance from the vehicle center of gravity to the rear axle; $\delta$ is the steering angle at the front wheels.

Let $\beta_{mrff}$ and $\beta_{mrfr}$ be the front and rear wheel sideslip angles respectively, which may be expressed as $$\beta_{mrflinf} = \beta_{mrflincg} + \frac{b_f \omega_{mrfz}}{v_{mrfx}} - \delta \qquad (32)$$

$$\beta_{mrflinr} = \beta_{mrflincg} - \frac{b_r \omega_{mrfz}}{v_{mrfx}}$$

For small wheel sideslip angles, i.e.

$$|\beta_{mrff}| \leq \bar\beta_f$$

$$|\beta_{mrfr}| \leq \bar\beta_r \qquad (33)$$

the lateral forces applied to the front axle and the rear axle may be approximated as the following linear relationship $$F_{mrff} \approx -c_f \beta_{mrff}$$

$$F_{mrfr} \approx -c_r \beta_{mrfr} \qquad (34)$$

where $\bar\beta_f$ and $\bar\beta_r$ are front and rear wheel slip angle upper bounds to guarantee the linear relationships in (34), and $c_f$ and $c_r$ are the cornering stiffness of the front and rear tires respectively. $c_f$ and $c_r$ usually vary with the road condition and the vehicle operation condition. Due to the steering angle and large loading towards the front axle, the front wheel sideslip angle $\beta_{mrff}$ usually exceeds the linear range of the tire force much earlier than the rear axle tires. Notice as soon as (33) is satisfied, (31)-(34) are true. If the vehicle is operated in its nonlinear dynamics range, using (34) with fixed values for $c_f$ and $c_r$ is no longer close to the true wheel sideslip angles. However the computation may still be used for other computational purposes. For example, the computation may be used in the switch logic for other computations. For this reason, the following linear sideslip angles may be defined regardless of whether the vehicle is operated in its linear dynamics range or its nonlinear dynamics range $$\beta_{mrflinf} = \frac{F_{mrff}}{c_f} \qquad (35)$$

$$\beta_{mrflinr} = \frac{F_{mrfr}}{c_r}$$

where the lateral tire forces may be calculated as in the following, which are true for all the driving conditions (independent of road surface mu level, the aggressiveness of the driver's driving input, and if the tires entering their nonlinear ranges, etc.)

$$F_{mrff} = \frac{I_z \dot\omega_{mrfz} + (I_y - I_x)\omega_{mrfy}\omega_{mrfx} - Y_z + b_r M_t a_{mrfy}}{(b_f + b_r)\cos\delta} \qquad (36)$$

$$F_{mrfr} = \frac{-I_z \dot\omega_{mrfz} - (I_y - I_x)\omega_{mrfy}\omega_{mrfx} - Y_z + b_f M_t a_{mrfy}}{(b_f + b_r)}$$

In step 700 the sensor information may be transformed into a body frame of reference. The raw rear wheel sideslip angle $\beta_{mrflinrraw}$ is determined in step 702 and is used here as an estimation and control reference. It may be further expressed as the following:

$$\beta_{mrflinrraw} = p_{yawgrad} a_{mrfy} - p_{yawacccoef} \dot{\omega}_{mrfz} - p_{coupling} \omega_{mrfy} \omega_{mrfx} + p_{yawtorq} Y_z \quad (37)$$

where the four composite parameters, called yaw gradient, yaw acceleration coefficient, coupling coefficient and yaw torque gain respectively, may be related to the vehicle parameters as in the following $$p_{yawgrad} = \frac{b_f M_t}{(b_f + b_r)c_r} \quad (38)$$

$$p_{yawacccoef} = \frac{I_z}{(b_f + b_r)c_r}$$

$$p_{coupling} = \frac{(I_y - I_x)}{(b_f + b_r)c_r}$$

$$p_{yawtorq} = \frac{1}{(b_f + b_r)c_r}$$

The four composite parameters may also be estimated through the fitting of the empirical vehicle data to (37) during linear vehicle dynamics. This can also be done in real-time adaptively.

Those parameters may also be calculated based on vehicle testing data. For example, using a Least Square Parameter Identification for the maneuvers within the linear tire force range, the calculated $\beta_{mrflinrraw}$ may be used to fit the measured sideslip angle.

In order to take account into account the effect lateral load transfer, a load transfer correction factor is delivered in step 704.

if $(|\theta_{xr}| \leq 0.75\, p_{rollgrad})$
{

$$\beta_{mrflinrraw} = \frac{\beta_{mrflinrraw}}{1 - p_{csxmax}(|\theta_{xr}|/p_{rollgrad})^2};$$

}
else
{

$$\beta_{mrflinrraw} = \frac{\beta_{mrflinrraw}}{1 - 0.5625\, p_{csxmax}};$$

}

(39)

The final linear sideslip angle may be calculated in step 706 in the following:

$$\beta_{mrflinr} = p_{yawmdl} \beta_{mrflinr} + (1 - p_{yawmdl}) \beta_{mrflinrraw} \quad (40)$$

where $\theta_{xr}$ is the relative roll angle calculated in RSC, which reflects the lateral load transfer, $p_{rollgrad}$ is the roll gradient and $p_{csxmax}$ is the maximum percentage change of the cornering stiffness reduction due to lateral load transfer. The linear lateral velocity based on the linear sideslip angle in step 708 is defined as $$v_{mrflinray} = v_{mrfx} \tan(\beta_{mrflinr}) \quad (41)$$

If an equivalent cornering stiffness is defined at the rear wheel $c_{eqr}$ in the following $$c_{eqr} = \frac{F_{mrfr}}{\beta_{mrfr}} \quad (42)$$

the equivalent cornering stiffness ratio in step 710 may be computed as $$S = \frac{c_r}{c_{eqr}} \quad (43)$$

Since $c_r$ is proportional to the surface friction level $\mu$ (where $\mu=1$) and $c_{eqr}$ is proportional to the actual road surface $\mu$ level, the equivalent cornering stiffness ratio indirectly relates to the road surface $\mu$, although the actual function would be rather complicated.

If the vehicle's true (nonlinear) sideslip angle $\beta_{mrfr}$ is known, then the aforementioned equivalent cornering stiffness ratio may be calculated as in the following:

$$S = \frac{\beta_{mrfr}}{\beta_{mrflinr}} \quad (44)$$

However, $\beta_{mrfr}$ is not known and needs to be calculated first, but $\dot{\beta}_{mrfr}$ is known.

A good computation strategy would be working on $\dot{\beta}_{mrfr}$ and using washout filter to obtain some rough computation of S, and using such a calculated S in some other conditions related to the road surface $\mu$. The raw value $S_{raw}$ of the equivalent cornering stiffness ratio S is computed through a washout filter and the computation may be summarized as in the following if $(|\beta_{mrflinr}| > p_{minlatvel})$
    $v_{temp} = \beta_{mrflinr} v_{mrfx}$;
else if $(\beta_{mrflinr} \geq 0\, \&\&\, \beta_{mrflinr} \leq_{minlatvel})$
    $v_{temp} = p_{minlatvel} v_{mrfx}$;
else
    $v_{temp} = -p_{minlatvel} v_{mrfx}$;

(45)

$$S_{raw} = \left[\gamma_{sintcoef} - \frac{(\dot{v}_{mrfx} \beta_{mrflinr} + v_{mrfx} \dot{\beta}_{mrflinr})\Delta T}{v_{temp}}\right] S_{raw} + \frac{\dot{v}_{mrfy} \Delta T}{v_{temp}};$$

where $\gamma_{sintcoef}$ is the washout filter coefficient, $p_{minlatvel}$ is the lower bound of the linear sideslip angle $\beta_{mrflinr}$, $\Delta T$ is the sampling time, $v_{mrfx}$ is the longitudinal velocity of the vehicle.

Considering at low vehicle speeds, the above computation may be contaminated by the signal noises and the other errors, hence at low vehicle speed, the equivalent cornering stiffness ratio is set to 1. Since S also reflects the road surface $\mu$, thus during known road surface cases, S needs to be limited by the known value. Therefore, if $(v_{mrfx} < p_{smspd})$
    $S_{raw} = 1$;
else
{
    if $(\mu_{max} > p_{smmu})$ (46)

-continued $$S_{raw} = \min\left(\frac{1}{p_{smmu}}, \max(S_{raw}, 1)\right);$$

else $$S_{raw} = \min\left(\frac{1}{p_{smmu}}, \max(S_{raw}, 1)\right);$$

}

The final equivalent cornering stiffness ratio is obtained by feeding the computed raw value through a low-pass filter in the following:

$$S = d_{lpf1} S + n_{lpf1} S_{raw} \tag{47}$$

where $n_{lpf1}$, $d_{lpf1}$ are coefficients for the low pass filter.

Lateral Velocity and its Reference

DVD schemes are set forth below. The first, second, or combination of both, may be used. The first scheme is illustrated in step 711a and uses a longitudinal kinematics constraint. If the longitudinal velocity is known, then the third equation in (29) or (30) becomes redundant. That is, the third equation in (29) or (30) may be eliminated. However, a total elimination of such an equation would not be desirable since potential useful information may be lost. A case where the vehicle is driven steady state on a constant radius turn on a level ground is illustrated. In such a driving case, the acceleration balancing through the first velocity equation in (29) or (30) may actually be used to constrain the lateral velocity (the so-called centrifugal acceleration)

$$a_{mrfx} = -v_{mrfy} \omega_{mrfz} \tag{48}$$

or $$v_{mrfy} = -\frac{a_{mrfx}}{\omega_{mrfz}}$$

Therefore, the first velocity equation may be used as a constraint for the estimated lateral velocity. Such a constraint is called the longitudinal kinematics constraint, which is expressed as $$k_x(v_{mrfray}, v_{mrfraz}) = a_{mrfx} + \omega_{mrfz} v_{mrfray} - \omega_{mrfy} v_{mrfraz} - \dot{v}_{mrfx} \tag{49}$$

Notice that the true lateral velocity and longitudinal velocity should satisfy $$k_x(v_{mrfray}, v_{mrfraz}) = 0 \tag{50}$$

and good estimations $\hat{v}_{mrfx}$ and $\hat{v}_{mrfray}$ of $v_{mrfx}$ and $v_{mrfray}$ should make $|k_x(v_{mrfray}, v_{mrfraz})|$ as small as possible. The estimation error is:

$$e_{mrfy} = v_{mrfray} - \hat{v}_{mrfray}$$

$$e_{mrfz} = v_{mrfraz} - \hat{v}_{mrfraz} \tag{51}$$

By using the kinematics constraint shown in (51), the following estimation scheme may be formulated as:

$$\dot{\hat{v}}_{mrfray} = \bar{a}_{mrfray} - \omega_{mrfz} v_{mrfx} + \omega_{mrfx} \hat{v}_{mrfraz} + G_1 k_x(v_{mrfray}, v_{mrfraz})$$

$$\dot{\hat{v}}_{mrfraz} = \bar{a}_{mrfaz} + \omega_{mrfy} v_{mrfx} - \omega_{mrfx} \hat{v}_{mrfray} + G_2 k_x(v_{mrfray}, v_{mrfraz}) \tag{52}$$

where $G_1$ and $G_2$ are gains needed to be properly chosen. The error dynamics for estimation scheme (52) satisfies $$\dot{e}_{mrfy} = -\omega_{mrfx} e_{mrfz} - G_1(\omega_{mrfy} e_{mrfz} - \omega_{mrfz} e_{mrfy})$$

$$\dot{e}_{mrfz} = -\omega_{mrfx} e_{mrfy} - G_2(\omega_{mrfy} e_{mrfz} - \omega_{mrfz} e_{mrfy}) \tag{53}$$

The gains $G_1$ and $G_2$ may then be selected such that the errors in (59) approach zero. If the following function is chosen $$V = \frac{1}{2}(e_{mrfy}^2 + e_{mrfz}^2) \tag{54}$$

then its derivative along the error dynamics (53) may be calculated as $$\dot{V} = G_1 \omega_{mrfz} e_{mrfy}^2 - G_2 \omega_{mrfy} e_{mrfz}^2 - G_1 \omega_{mrfy} e_{mrfx} e_{mrfy} + G_2 \omega_{mrfz} e_{mrfy} e_{mrfz} \tag{55}$$

If a positive number ρ and the gains $G_1$ and $G_2$ are chosen in the following $$G_1 = -\rho \omega_{mrfz}$$

$$G_2 = \rho \omega_{mrfy} \tag{56}$$

then (55) can be made negative $$\dot{V} = -\rho(\omega_{mrfz} e_{mrfy} - \omega_{mrfy} e_{mrfz})^2 \leq 0 \tag{57}$$

which implies the choice of gains in (56) will keep the rate change of the estimation error decreasing. Hence, (52) provides a useful construction of the lateral velocity, which utilizes feedback information.

If the lateral angle $\Theta_{x\sigma}$ is defined as:

$$\Theta_{x\sigma} = \int_{t_1}^{\sigma} \omega_{mrfx}(\tau) d\tau \tag{58}$$

and considering $v_{mrfraz}$ is close to zero and is negligible, (52) may be further simplified $$v_{mrfray}(t_2) = \sec\Theta_{xt_2}\left\{v_{mrfray}(t_1) + \int_{t_1}^{t_2}[\bar{a}_{mrfray} - \omega_{mrfz} v_{mrfx} - \rho \omega_{sz} k_x(\hat{v}_{mrfray}, \hat{v}_{mrfraz}))\cos\Theta_{x\sigma} - (\bar{a}_{mrfraz} + \omega_{mrfy} v_{mrfx} + \rho \omega_{sy} k_x(\hat{v}_{mrfray}, \hat{v}_{mrfraz}))\sin\Theta_{x\sigma}]d\sigma\right\} \tag{59}$$

In the second scheme set forth, a road constraint alignment (RCA) in step 711b is determined. An RCA presumes the vehicle cannot lift off from the ground for a long period of time. Hence, the vertical velocity must be very small and its derivative must not have significant low frequency content. If the vertical velocity is neglected, then the vertical velocity equation becomes redundant. However, a total elimination of such an equation would be bad since potential useful information is lost. Considering a case where the vehicle is in a dynamic turn on a smooth road surface and the vehicle has no-zero roll motion, the vehicle lateral velocity may be constrained in the following equation (the so-called centrifugal acceleration):

$$\omega_{mrfx} v_{mrfray} = a_{mrfraz} + \omega_{mrfy} v_{mrfx} \quad (60)$$

or $$v_{mrfy} = \frac{a_{mrfraz} + \omega_{mrfy} v_{mrfx}}{\omega_{mrfx}}$$

Generally speaking, RCA can be described as:

$$k_z(v_{mrfx}, v_{mrfray}) = LPF[\bar{a}_{mrfraz} + \omega_{mrfy} v_{mrfz} - \omega_{mrfx} v_{mrfray}] = 0 \quad (61)$$

where LPF stands for the low-pass filtering. This may be referred to as a vertical kinematics constraint. For estimated velocities, (61) may be thought of as an enforcement mechanism for compensating potential error sources. Denote the estimated longitudinal and vertical velocities as $\hat{v}_{mrfx}$ and $\hat{v}_{mrfray}$, the estimation errors as $$e_{mrfx} = v_{mrfx} - \hat{v}_{mrfx}$$

$$e_{mrfy} = v_{mrfray} - \hat{v}_{mrfray} \quad (62)$$

One of the estimation schemes may be described as in the following:

$$\dot{\hat{v}}_{mrfx} = \bar{a}_{mrfx} + \omega_{mrfz} \hat{v}_{mrfray} + H_1(v_{mrfx} - \hat{v}_{mrfx}) + H_2 k_z(\hat{v}_{mrfx}, \hat{v}_{mrfray})$$

$$\dot{\hat{v}}_{mrfray} = \bar{a}_{mrfray} - \omega_{mrfz} \hat{v}_{mrfx} + H_3 k_z(\hat{v}_{mrfx}, \hat{v}_{mrfray}) \quad (63)$$

where $H_1$, $H_2$ and $H_3$ are gains needed to be properly chosen. Notice that $v_{sx}$ is calculated from wheel speed sensor signals together with certain calculated signals, which means it is independent of computations in (65). The error dynamics for the estimation scheme (63) satisfies $$\dot{e}_{mrfx} = \omega_{mrfz} e_{mrfy} - H_1 e_{mrfx} - H_2 LPF[\omega_{mrfx} e_{mrfy} - \omega_{mrfy} e_{mrfx}]$$

$$\dot{e}_{mrfy} = -\omega_{mrfz} e_{mrfx} - H_2 LPF[\omega_{mrfx} e_{mrfy} - \omega_{mrfy} e_{mrfx}] \quad (64)$$

For analysis simplicity, the LPF may be removed.
Let $$V = \frac{1}{2}(e_{mrfx}^2 + e_{mrfy}^2) \quad (65)$$

then the derivative of V along the error dynamics (65) may be calculated as $$\dot{V} = -H_1 e_{mrfx}^2 - H_2 \omega_{mrfx} e_{mrfy} e_{mrfx} + H_2 \omega_{mrfy} e_{mrfx}^2 - H_3 \omega_{mrfx} e_{mrfy}^2 + H_3 \omega_{mrfy} e_{mrfy} e_{mrfx} \quad (66)$$

If $$H_1 > 0$$

$$H_2 = -\rho \omega_{mrfy}$$

$$H_3 = \rho \omega_{mrfx} \quad (67)$$

then $$\dot{V} = -H_1 e_{mrfx}^2 - \rho(\omega_{mrfx} e_{mrfy} - \omega_{mrfy} e_{mrfx})^2 \leq 0 \quad (68)$$

which implies that the choice of gains in (67) will keep rate change of the estimation error decrease. By replacing the estimated longitudinal velocity with the external longitudinal velocity (for example, from wheel speed sensors), the following provides a construction of the intended estimation of the lateral velocity $$v_{mrfray}(t_2) = -v_{mrfx}(t_2)\tan(\Theta_{zt_2}) + \sec(\Theta_{zt_2}) \quad (69)$$

$$\left\{ v_{mrfray}(t_1) + \int_{t_1}^{t_2} [(\bar{a}_{mrfx} - \rho\omega_{mrfy} k_z(\hat{v}_{mrfx}, \hat{v}_{mrfray}))\sin(\Theta_{z\sigma}) + (\bar{a}_{mrfray} + \rho\omega_{mrfx} k_z(\hat{v}_{mrfx}, \hat{v}_{mrfray}))\cos(\Theta_{z\sigma})] d\sigma \right\}$$

where $$\Theta_{zt} = \int_{t_1}^{\tau} \omega_{mrfz}(\tau) d\tau \quad (70)$$

Notice that the above two schemes can be used only when the dynamics measured by the IMU sensors experiences large angular rates. If the angular rates are small, the afore-mentioned constraints are no longer useful. For this reason, the computation described before cannot be directly used to compute the lateral velocity of the vehicle body at the rear axle but projected on the moving road frame. However, they could serve as a reference lateral velocity.

In step 712, the reference lateral velocity is computed. Considering vertical velocity is small, the vertical velocity equation in the previous RCA can be dropped. Therefore, $$dv_{mrfray} = \bar{a}_{mrfray} - \omega_{mrfz} v_{mrfx} - \rho\omega_{mrfz}(\bar{a}_{mrfx} + \omega_{mrfz} v_{mrfray} - v_{mrfx}) \quad (71)$$

Equation (71) is accurate enough when the vehicle does not have significant heave and roll motion. If the vehicle is driven on a bumpy road with significant roll motion, the cross product term $\omega_{mrfx} v_{mrfraz}$ needs to be estimated and add to (71) so as to remove the error.

Equation (71) may be integrated to obtain a signal which is a reference signal for the lateral velocity at the rear axle and projected on the moving road frame. Due to the computational errors in the attitudes and the sensor errors, both the integration rate and the initial condition will be changed based on certain reliable computations.

One of such reliable signals is the linear sideslip angle of the vehicle at its rear axle, which is already calculated above. The magnitude of such a variable may be calculated a in the following $$\beta_{mrflinrmag} = p_{dlpflbetam}\beta_{mrflinrmag} + (1 - p_{dlpflbetam}|\beta_{mrflinr}|) \quad (72)$$

The roll attitude of the moving road frame $\theta_{mrfx}$ may have computational errors, the integration coefficient used will be adapted based on the magnitude of $\theta_{mrfx}$ as in the following $$\begin{aligned}
&\text{if } (|\theta_{mrfx}| \leq \theta_1) \\
&\quad \gamma_{intcoef} = p_{intcoef\,1}; \\
&\text{else if } (\theta_1 \leq |\theta_{mrfx}| \leq \theta_2) \\
&\quad \gamma_{intcoef} = p_{intcoef\,2}; \\
&\text{else if } (\theta_2 \leq |\theta_{mrfx}| \leq \theta_3) \\
&\quad \gamma_{intcoef} = p_{intcoef\,3}; \\
&\text{else if } (\theta_2 \leq |\theta_{mrfx}| \leq \theta_3) \\
&\quad \gamma_{intcoef} = p_{intcoef\,4}; \\
&\text{else} \\
&\quad \gamma_{intcoef} = p_{intcoef\,5};
\end{aligned} \quad (73)$$

The further adaptation of the integration rate is conducted based on the indication of the road surface μ reflected by the maximum acceleration of the vehicle and the magnitude of the equivalent cornering stiffness ratio computed above $$\mu_{max} = n_{lpf\,2}\mu_{max} + \frac{d_{lpf\,2}}{g}\sqrt{a_{mrfrax}^2 + a_{mrfray}^2 + a_{mrfrac}^2}$$

if ( ($\mu_{max} > p_{muminhighmu}$ or $S < p_{smaxhighmu}$)
   and $|a_{mrfray}| \leq p_{minlata}$ )
{
   $\gamma_{intcoef} = \min(\gamma_{intcoef}, \gamma_{intcoeffast})$;
} (74)

The conditional integration of (71) may be conducted in the following if ( ( ( $\beta_{mrflinrmag} \geq p_{smlinb}$ && $S \leq p_{minslowmu}$ )
   or $\omega_{mag} \geq p_{smrai}$ || $|d_{swa}| > p_{smswa}$ ) & $\&v_{mrfx} \geq p_{smspd}$)
{ $k_{cgain} = k_{gain}(v_{mrfx} \geq p_{gainswitchspd}$ );
   $k_{cx} = \bar{a}_{mrfrax} + w_{mrfz}v_{mrfrefy} - \dot{v}_{mrfx}$;
   if($k_{cx} \geq k_{cxmax}$)
     $k_{cx} = k_{cxmax}$;
   if($k_{cx} \leq -k_{cxmax}$)
     $k_{cx} = -k_{cxmax}$;
   $v_{mrfrefy} = v_{mrfrefy}\gamma_{intcoef} + (\bar{a}_{mrfray} - w_{mrfz}v_{mrfx} - k_{cgain}w_{mrfz}k_{cx})$; } (75)

Let the final computation of the lateral velocity at the rear axle be $v_{mrfray}$. The above calculated lateral velocity reference may be bounded by the final computation of $v_{mrfray}$. The following conditioning will be conducted if the final computation of $v_{mrfray}$ exceeds the magnitude of the final computation $v_{mrfrefy}$, the reference value will be gradually adjusted to approach the final computation $v_{mrfray}$ if ( ( $v_{mrfrefy} \geq v_{mrfray}$ and $v_{mrfray} \geq 0$ )
   or ( $v_{mrfrefy} \geq v_{mrfray}$ and $v_{mrfray} \leq 0$ ) )
$v_{mrfrefy} = v_{mrfray} + (v_{mrfrefy} - v_{mrfray})/p_{rho}$; (76)

A further conditioning will be conducted at linear sideslip range, which assigns the computation to the linear velocity calculated from the linear sideslip angle if ( ( $v_{mrfrefy}v_{mrflinray} < 0$ or ($v_{mrflinr} \geq 0$ and $v_{mrfrefy} \leq v_{mrflinray}$)
   or ($v_{mrflinr} \leq 0$ and $v_{mrfrefy} \geq v_{mrflinray}$)) and ($S \leq p_{minslowmu}$))
{
   $v_{mrfrefy} = v_{mrflinray}$;
} (77)

A further magnitude limitation is necessary if ($v_{mrfrefy} > 0$)
   $v_{mrfrefy} = \min(\min(p_{betabound}|v_{mrfx}|,p_{maxlatvel})),v_{mrfrefy})$; (78)
else
   $v_{mrfrefy} = \max(\max(-p_{betabound}|v_{mrfx}|,-p_{maxlatvel})),v_{mrfrefy})$;

If the conditions in (75) are not satisfied, the reference lateral velocity will be switched to the linear lateral velocity else
{
   $v_{mrfrefy} = v_{mrflinray}$; (79)
}

Now the low frequency portion $v_{mrfssy}$ of the lateral velocity at the rear axle and on the moving road frame in step 714 may be determined. This may be done through a steady state recovery filter in the following $$v_{mrfssy} = d_{ddc}v_{mrfssy} + n_{ssc}v_{mrfrefy}$$ (80)

where $d_{ssc}$, $n_{ssc}$ are the filter coefficients.

Another method to obtain the low frequency portion $v_{mrfssy}$ is through the following initial condition resetting $v_{mrfssy} = d_{ssc}v_{mrfssy} + n_{ssc}v_{mrfrefy}$
if(( $v_{mrfray}v_{mrflinry} < 0$
   or ($v_{mrflinry} \geq 0$ and $v_{mrfray} \leq v_{mrflinry}$)
   or ($v_{mrflinry} \leq 0$ and $v_{mrfray} \geq v_{mrflinry}$)
   ) and ($S \leq p_{minslowmu}$)) (81)
{
   $v_{mrfssy} = v_{mrflinry} - v_{mrfdyny}$;
}

Now the computation of the dynamic portion of the lateral velocity at the rear axle on the moving road frame in step 716 is considered. This may be referred to as the high frequency portion. The derivative of such a velocity may be expressed as in the following $$dv_{mrfy} = \bar{a}_{mrfy} - \omega_{mrfz}v_{mrfx} + \omega_{mrfx}v_{mrfz}$$ (82)

Considering the vertical velocity is small enough, the following is true $$dv_{mrfy} = \bar{a}_{mrfy} - \omega_{mrfz}v_{mrfx}$$ (83)

Using a anti-drift integration, the dynamic portion $v_{mrfdyny}$ of the lateral velocity $v_{mrfray}$ may be calculated as in the following $$v_{mrfdyny} = d_{adi}v_{mrfdyny} + n_{adi}dv_{mrfy}$$ (84)

Since the potential errors in the computation in (83) a computation combining (84) with initial condition enforcement is conducted as in the following $v_{mrfdyny} = d_{adi}v_{mrfdyny} + n_{adi}dv_{mrfray}$
if(( $v_{mrf}v_{mrflinry} < 0$
   or ($v_{mrflinry} \geq 0$ and $v_{mrfray} \leq v_{mrflinry}$)
   or ($v_{mrflinry} \leq 0$ and $v_{mrfray} \geq v_{mrflinry}$)
   ) and ($S \leq p_{minslowmu}$)) (85)
{
   $v_{mrfdyny} = v_{mrflinry} - v_{mrfssy}$;
}

In step 718 the final lateral velocity may be determined by combining the steady state and dynamic lateral velocity. A variation of (85) may be further conducted by using a smooth ramping to replace a sudden switch $v_{mrfdyny} = d_{adi}v_{mrfdyny} + n_{adi}dv_{mrfray}$
if(( $v_{mrf}v_{mrflinry} < 0$
   or ($v_{mrflinry} \geq 0$ and $v_{mrf} \leq v_{mrflinry}$)

-continued $$\begin{aligned}&\text{or } (v_{mrflinry} \leq 0 \text{ and } v_{mrf} \geq v_{mrflinry})\\&) \text{ and } (S \leq p_{minslowmu}))\\&\{\\&\quad v_{mrfdyny} = v_{mrflinry} - v_{mrfssy} + (v_{mrfdyny} - v_{mrflinry} + v_{mrfssy})/p_{rho};\\&\}\end{aligned}$$ (86)

A further variation is the following $$\begin{aligned}&\text{if }((v_{mrf}v_{mrflinry} < 0\\&\quad \text{or } (v_{mrflinry} \geq 0 \text{ and } v_{mrf} \leq v_{mrflinry})\\&\quad \text{or } (v_{mrflinry} \leq 0 \text{ and } v_{mrf} \geq v_{mrflinry})\\&) \text{ and } (S \leq p_{minslowmu}))\\&\quad v_{mrfdyny} = v_{mrflinry} - v_{mrfssy} + (v_{mrfdyny} - v_{mrflinry} + v_{mrfssy})/p_{rho};\\&\text{else}\\&\quad v_{mrfdyny} = d_{adi}v_{mrfdyny} + n_{adi}dv_{mrfray};\end{aligned}$$ (87)

The final lateral velocity at the rear axle and on the moving road frame may be used to control various vehicle systems including but not limited to a yaw control system and other dynamic control systems.

Longitudinal Velocity Determination

In this embodiment, the vehicle longitudinal velocity is determined based on the compensated wheel speed sensor signals, the IMU sensor cluster outputs and the computed signals from the other modules in ISS unit, the wheel control status (in ABS, TCS, RSC, AYSC, or driver braking), engine torque and throttle information. The vehicle longitudinal velocity considered here is defined along the longitudinal direction of the moving road frame. The wheel speeds are the linear velocities which are projected on the instantaneous plane defined by the moving road frame (the longitudinal and lateral axle of the moving road frame). The algorithms and methods presented here reduce errors in existing longitudinal velocity computations used in brake control systems (ABS and TCS) and the vehicle stability control systems (such as ESC and RSC), which are based on the traditional ESC sensor set or the RSC sensor set.

The vehicle longitudinal velocity is an important variable used for vehicle dynamics controls. For example, the ABS and TSC brake controls activate the individual brake based on the longitudinal slip ratio of the corresponding wheel. The longitudinal slip ratio at a specific corner measures the relative difference between the velocity of the vehicle body at the corresponding corner and the linear velocity of the center of the corresponding wheel. Slip ratios are also used in ISCS functions such as RSC, YSC and LSC.

Another usage of the longitudinal velocity is to calculate the vehicle sideslip angle which is obtained by dividing the calculated lateral velocity at specific location of the vehicle body (for example at the vehicle center of gravity or at the middle of the rear axle) by the longitudinal velocity. The computation of lateral velocity is affected by the accuracy of the longitudinal velocity, the errors in the longitudinal velocity itself will be directly transferred to the errors in sideslip angle computation.

There exist many methods pursued by the existing stability controls, none of them achieves the accuracy and robustness that is deemed necessary for the ISCS function requirement For example, in a driving scenario for a RWD vehicle equipped with the RSC system, during a two-wheel-lift event (two inside wheels are up in the air), the RSC requests a large brake pressure in the front outside wheel and there is some driving torque applied to the rear wheel. In this case, none of the four-wheel speed sensor signals provide useful information to specify the vehicle longitudinal velocity. A natural approach is to integrate the available longitudinal acceleration to obtain an indication of the vehicle speed. However, due to the gravity contamination through vehicle pitch attitude and the lateral motion contamination due to the vehicles lateral sliding motion, such an integration of the longitudinal acceleration may have significant errors and may further reduce the effectiveness of the RSC function or introduce potential false activations.

Another problem with the existing method is that on ice or snow the four individual wheels may all be in abnormal status (none of them is a good indication of the vehicle speed due to the fact that none of them is in pure rolling), and the longitudinal acceleration is again contaminated by the side sliding of the vehicle, the existing method generates significant errors which will affect the control actions.

Referring now to FIG. 9, the longitudinal velocity estimation is determined using a wheel speed block 800 that receives the wheel speeds and provides a scaling factor 802 and wheel compensation 804 therein. The output of the wheels' speed compensations is provided to a longitudinal reference, contact patch velocity monitoring and the longitudinal slip ratio block 806. The output of the longitudinal velocity is fed back into the scaling factor block 802 from block 806. Block 806 receives various inputs from sensors and the like. For example, the moving reference frame yaw rate, the steering angle, the wheels and powertrain actuation status, the driver braking status, and the linear sideslip angle at the moving road frame is provided to block 806. A longitudinal velocity derivative is determined using the longitudinal acceleration at the rear axle in the moving road frame, the yaw rate in the moving road frame, the G pitch and R pitch factors, and the lateral velocity at the rear angle in the moving road frame. The longitudinal velocity derivative is determined in block 808 from the previous four sensors and is provided to block 806 to determine a longitudinal slip ratio in the contact patch velocity monitor. The output of the block 806 is provided to arbitration and filtering block 810 which ultimately determines the longitudinal velocity.

Referring now to FIG. 10, the block 800 is illustrated in further detail. Block 800 includes the front left wheel speed-based algorithm 820, the front right wheel-based algorithm 822, the rear left wheel-based algorithm 824, and the rear right wheel-based algorithm 826. A front wheel-based algorithm 828 and a rear wheel-based algorithm 830 are also provided. Contact patch velocity estimation 832 and a slip ratio computation 834 may also be provided. Computations with these signals and the wheel actuation status and driver braking status may be provided in block 806. Block 840 determines whether the wheels are divergent. In block 842 if the wheels are divergent, the wheel speeds may be trusted and the longitudinal reference velocity is output therefrom. If the wheels are not divergent in block 842, an SSC filter may be provided. SSC filter combines the longitudinal velocity derivative with an anti-integration drift filter 846 to provide an output therefrom. The specifics of the above-mentioned calculations are further described below with respect to block 14.

Figure 11:
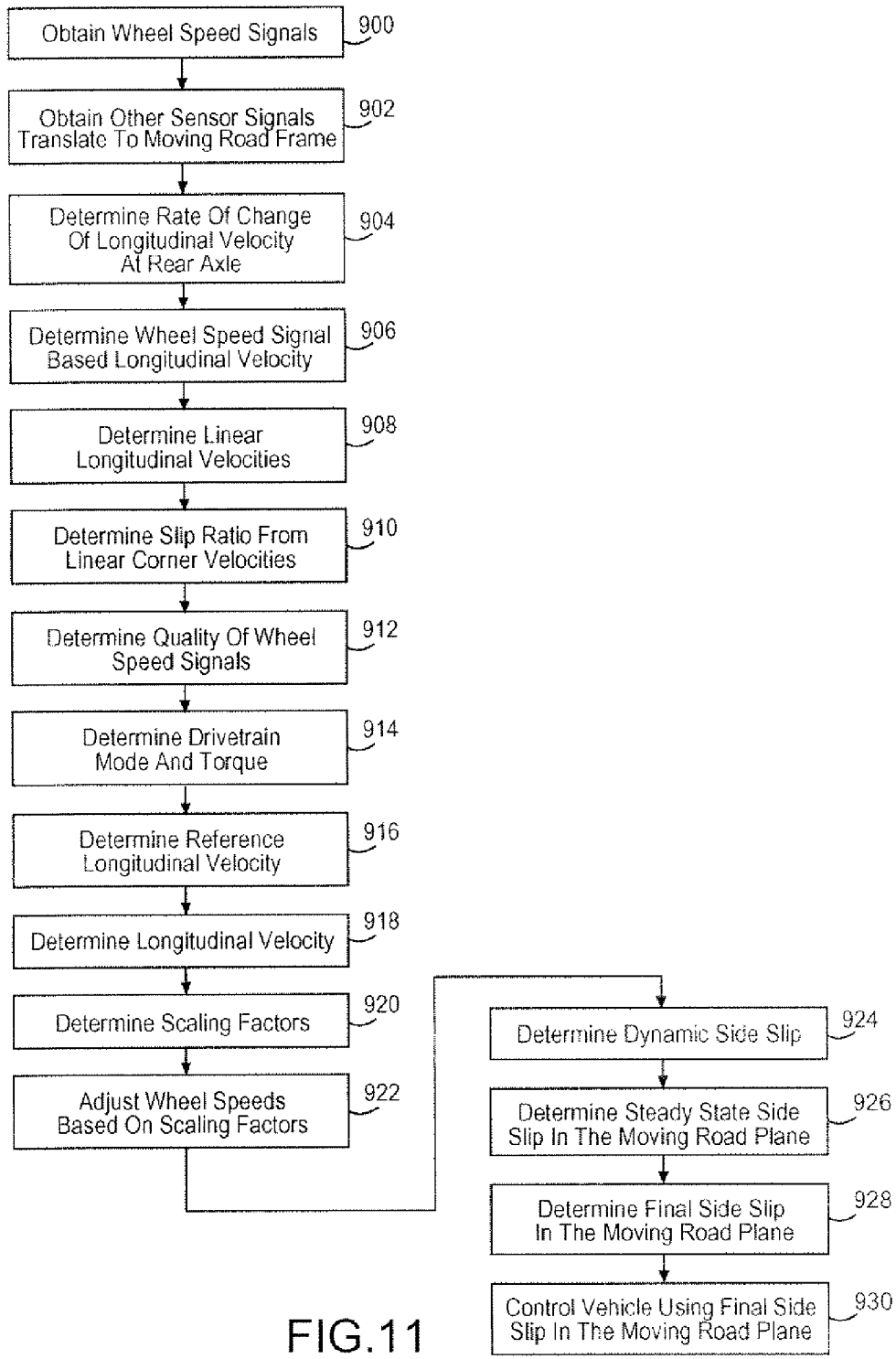
FIG. 11 is a flow chart illustrating a method for determining the longitudinal velocity of the vehicle.

Referring now to FIG. 11, in step 900 the various wheel speed sensors are determined. In step 902, the other sensor outputs are determined and translated into moving road plane.

The rate change of the vehicle longitudinal velocity in the moving road frame may be calculated from the signals in the moving road frame in step 904 in the following:

$$\dot{v}_{mrfx} = a_{mrfx} + \omega_{mrfz} v_{mrfray} + g \sin \theta_{mrfy} \qquad (88)$$

where $\theta_{mrfy}$ is the pitch angle of the moving road frame with respect to sea level, it is equivalent to the so-called road inclination angle or road slope. $\theta_{mrfy}$ may be calculated in the following $$\theta_{mrfy} = \theta_{sy} - \Delta_y - \theta_{yr} \qquad (89)$$

where $\theta_{sy}$ is the global pitch angle of the sensor frame calculated based on the IMU sensor signals, $\Delta\theta_y$ is the sensor pitch misalignment and $\theta_{yr}$ is the relative pitch that reflects the suspension height difference between the front and the rear suspensions.

Since computing the longitudinal velocity at the location of the center of the rear axle is desired, the above computation in (88) will be further changed to $$dv_{mrfrax} = a_{mrfx} + p_{xsl2ra}(\omega_{mrfy}^2 + \omega_{mrfz}^2) + \omega_{mrfz} v_{mrfray} + g \sin \theta_{mrfy} \qquad (90)$$

where $p_{xsl2ra}$ is the longitudinal distance between the sensor location and the rear axle and $v_{mrfray}$ is the lateral velocity at the rear axle.

Theoretically, the longitudinal velocity at rear axle $v_{mrfrax}$ is ready to be obtained from (90) through integration. However, due to sensor errors reflected in $a_{mrfx}$, $\omega_{mrfy}$, and $\omega_{mrfz}$, and the computational errors reflected in $v_{mrfray}$ and $\theta_{mrfy}$, such a direct long-term integration will generate significant errors. Instead of relying heavily on the integration of $dv_{mrfrax}$ all the time, the wheel speed sensor signals are used. A method to compute the longitudinal velocity which combines $dv_{mrfrax}$ and wheel speeds is determined below.

In step 906, the wheel speeds may be used to determine the longitudinal velocity. When the wheel speed sensor signals are properly compensated with the correct scaling factors, and when the vehicle is under normal driving conditions, the compensated wheel speed sensor signals are the correct indications of the vehicle longitudinal velocity. In such driving cases, the wheels are usually operating in a stable condition, i.e., their motion is close to the free rolling. In other driving situations, when the wheels are far away from free rolling, wheel speeds are no longer the good indications of the vehicle longitudinal speeds. Such cases could happen when the wheels are braked due to a driver's braking request: the wheels are braked due to brake control requests, the wheels are driven with large driving torques (for driving wheels, which usually causes wheels' spinning), the wheels lose traction (driving torque applied to wheels are greater than the road traction limit), the wheels slide longitudinally, the wheels slide laterally (vehicle builds up large sideslip angle), or the wheels are up in the air (for example, the inside wheels during a sharp turn).

However if there exists at least one wheel in free rolling motion and the rest of wheels are in unstable conditions, the wheel speed may still be used for determining the vehicle longitudinal velocity.

If the front left wheel is in free rolling or close to free rolling, the vehicle longitudinal velocity at the middle point of the rear axle but projected on the moving road frame may be calculated based on this wheel's compensated wheel speed signal as in the following $$v(0) = \frac{\kappa_0 w_0 + \omega_{mrfz}[t_f \cos(\delta) - b\sin(\delta)]}{\cos(\delta) + \sin(\beta)\sin(\delta)} \qquad (91)$$

where $\delta$ is the wheel's steering angle (road wheel steering angle), $\beta$ is the sideslip angle at the rear axle, b is the vehicle base, $t_f$ is the half track of the front axle; $\omega_{mrfz}$ is the vehicle body's yaw rate projected in the moving road frame, $\kappa_0$ is the wheel speed scaling factor of the front left wheel.

Similarly, if the front right wheel is in free rolling or close to free rolling, the vehicle longitudinal velocity at the middle point of the rear axle but projected in the moving road frame may be calculated based on this wheel's compensated wheel speed signals as in the following $$v(1) = \frac{\kappa_1 w_1 + \omega_{mrfz}[t_f \cos(\delta) - b\sin(\delta)]}{\cos(\delta) + \sin(\beta)\sin(\delta)} \qquad (92)$$

where $\kappa_1$ is the wheel speed scaling factor of the front right wheel.

If the rear left wheel is in free rolling, the vehicle longitudinal velocity at the middle point of the rear axle but projected in the moving road frame may be calculated based on this wheel's compensated wheel speed signals as in the following $$v(2) = \kappa_2 w_2 + \omega_{mrfz} t_r \qquad (93)$$

where $t_r$ is the half track of the rear axle, $\kappa_2$ the wheel speed scaling factor of the rear left wheel. If the rear left wheel is in free rolling, the vehicle longitudinal velocity at the middle point of the rear axle but projected in the moving road frame may be calculated based on this wheel's compensated wheel speed signals as in the following $$v(3) = \kappa_3 w_3 - \omega_{mrfz} t_r \qquad (94)$$

where $\kappa_3$ is the wheel speed scaling factor of the rear right wheel.

Based on the above four computed longitudinal velocities from the four wheel speed sensor signals, the velocity variables with their relative positions among the four variables may be computed as in the following $$v_{fmin} = \min(v(0), v(1)); v_{fav} = (v(0)+v(1))/2; v_{fmax} = \max(v(0), v(1));$$

$$v_{r\,min} = \min(v(2), v(3)); v_{rav} = (v(2)+v(3))/2; v_{r\,max} = \max(v(2), v(3));$$

$$v_{min} = \min(v_{fmin}, v_{r\,min}); v_{max} = \max(v_{fmax}, v_{r\,max});$$
$$v_{mid} = v_{fav} + v_{rav} - (v_{min} + v_{max})/2; \qquad (95)$$

For a given vehicle longitudinal velocity $v_{mrfrax}$, the linear velocity at each of the wheels but projected along the wheel longitudinal directions in step 908 can be computed as $$v_{vmrfrax}(0) = v_{mrfrax} \cos(\delta) + \omega_{mrfz}(b \sin(\delta) + t_f \cos(\delta))$$

$$v_{vmrfrax}(1) = v_{mrfrax} \cos(\delta) + \omega_{mrfz}(b \sin(\delta) - t_f \cos(\delta))$$

$$v_{vmrfrax}(2) = v_{mrfrax} + \omega_{mrfz} t_r$$

$$v_{vmrfrax}(3) = v_{mrfrax} - \omega_{mrfz} t_r \qquad (96)$$

Based on those linear corner speeds, the longitudinal slip ratios and their related quantities can be calculated in step 910 as in the following, where it is evident ρ(i) is the traditional definition of the longitudinal slip ratio of the ith wheel $$\text{for}(i = 0; i < 4; i++)$$
$$\{ \quad \rho(i) = \frac{v(i)}{\max(v_{min}, v_{vmrfrax}(i))} - 1;$$
$$\rho(i) = \min(1, \max(-1, \rho(i)));$$
$$d\rho(i) = p_{dlpf} d\rho(i) + (1-p_{dlpf})\frac{\rho(i)-\rho_{z1}(i)}{\Delta T}; \quad (97)$$
$$\rho_{z1}(i) = \rho(i);$$
$$\rho_p(i) = \rho(i) d\rho(i);$$
$$\rho_r(i) = v_{vmrfrax}(i) d\rho(i); \quad \}$$

Now the quality of the wheel speed signals on which the vehicle longitudinal velocity can be calculated in step 912 is determined for each wheel as in the following Also notice that the braking action at each of the wheels will affect using that wheel's wheel speed sensor to compute the longitudinal velocity. For this reason, the ith wheel's slip trend (divergent or convergent longitudinal slip indicated through the Boolean variable S[i].convergent_slip), acceleration trend (decelerated or accelerated wheel, indicated through the Boolean variable S[i].whldec and S[i].whlacc) and braking action (indicated through the Boolean variable S[i].inbraking) may be determined in the following

```
for(i = 0; i < 4; i++)
{ if (ρ_p(i) ≤ 0 ) S[i].convergent_slip = 1;
  else           S[i].convergent_slip = 0;
  if ( ρ_r(i) > p_minwacc)    S[i].whlacc = 1;
  else if (ρ_r(i) < -p_minwacc) S[i].whldec = 1;
  else                                              (98)
  { S[i].whlacc = 0;  S[i].whldec = 0; }
  if (S[i].ABS = 0 & &S[i].BTCS = 0 & & S[i].YSC = 0
     & & S[i].RSC =0 &&S[i].LSC = 0 & & P(i) ≤ p_minpres)
     S[i].inbraking = 0;
  else   S[i].inbraking = 1;  }
``` where S[i].ABS, S[i].BTCS, S[i].YSC, S[i].RSC and S[i].LSC are Boolean variables whose active values mean there are ABS, BTCS (brake traction control), YSC, RSC and LSC brake activations respectively.

The contact patch velocity difference between the left and right wheels at the same axles and the average of the contact patch velocities at the same axles can be computed as in the following $$\Delta v_{cpfa} = \left|\frac{w_1 - w_0}{2} - \omega_{mrfz} t_f \cos(\delta)\right|; \quad (99)$$
$$v_{cpfa} = \left|\frac{w_1 + w_0}{2} - \omega_{mrfz} b \sin(\delta) - v_{mrfrax}(\cos(\delta) + \sin(\delta)\beta_{mrfra})\right|;$$
$$\Delta v_{cpra} = \left|\frac{w_3 - w_2}{2} - \omega_{mrfz} t_r\right|;$$
$$v_{cpra} = \left|\frac{w_3 + w_2}{2} - v_{mrfrax}\right|;$$

and they can be used to determine if the contact patches are drastically different from each other at the same axle. Such a logic is conducted as in the following

```
if (Δv_cpfa ≤ p_dfth v_mrffavx)& &v_cpfa ≤ p_mfth v_mrffavx)
{ S[0].convergent_cpv = 1; S[1].convergent_cpv = 1; }
else
{ S[0].convergent_cpv = 0; S[1].convergent_cpv = 0; }  (100)
if (Δv_cpra ≤ p_dfth v_mrfravx & &v_cpra ≤ p_mfth v_mrfravx)
{ S[2].convergent_cpv = 1; S[3].convergent_cpv = 1; }
else
{ S[2].convergent_cpv = 0; S[3].convergent_cpv = 0; }
```

Next the drive train mode and torques are determined in step 914 based on the driving torque distribution $D_\tau$ information

```
if (D_τ ≤ 0)
   tDriveMode = REAR;
else if (D_τ > 0 & & D_τ < P_lrgdistribution)      (101)
   tDriveMode = TOD;
else
   tDriveMode = FOUR;
``` where REAR means RWD, TOD means torque-on-demand, and FOUR means 4×4 mode. $p_{lrgdistribution}$ is a threshold for torque distribution to determine the drive mode. Notice that a more detailed drivetrain determination can be used.

The braking torque applied to each of the four wheels can be computed based on the caliper pressure P(i) at the ith wheel $$\tau_b(0)=P(0)*p_{brkTGain0}; \tau_b(1)=P(1)*p_{brkTGain1};$$
$$\tau_b(2)=P(2)*p_{brkTGain2}; \tau_b(3)=P(3)*p_{brkTGain3}; \quad (102)$$

where $p_{brkTGaini}$ is the braking torque gain for the ith wheel.

Reference velocity by Integrating Wheel Speed Based Computation with the Acceleration Based Computation Based on the driver mode and the computed braking torque, the total torque applied to the ith wheel can be calculated. For example, in the following, for RWD and FWD modes, the total wheel end torque can be calculated using the engine torque distributed to the axle, $\tau_{axletorque}$ if (tDriveMode = REAR)
$$\{ \quad \tau_d(0) = (-1)*\tau_b(0); \tau_d(1) = (-1)*\tau_b(1);$$
$$\tau_d(2) = \frac{\tau_{axletorque}}{2} - \tau_b(2); \tau_d(3) = \frac{\tau_{axletorque}}{2} - \tau_b(3); \quad \}$$

if (tDriveMode = FRONT) $\quad (103)$
$$\{ \quad \tau_d(0) = \frac{\tau_{axletorque}}{2} - \tau_b(0); \tau_d(1) = \frac{\tau_{axletorque}}{2} - \tau_b(1);$$
$$\tau_d(2) = (-1)*\tau_b(2); \tau_d(3) = (-1)*\tau_b(3); \quad \}$$

In step 916, the reference longitudinal velocity is used to find the low frequency portion of the vehicle longitudinal velocities in the following.

Non-wheel lifting case which is indicated by relative roll, wheel departure angle and the front wheel control bits $$f(|\theta_{xr}| \leq p_{75th} \, p_{rollgradient} \, \&\& \, (\theta_{wda} = 0)$$
$$\&\& \, S[0].RSC = 0 \, \&\& \, S[1].RSC = 0 \,)$$
$$\{$$
$$\quad \text{if (tDriveMode = REAR)}$$
$$\quad \{$$

(104)

Considering the torque-on-demand drivetrain TOD is a transitional mode, a 4×2 assumption for TOD may be used. For some other powertrains, TOD may not be a transitional mode.

For the four-wheel-coasting-case, the reference longitudinal velocity is ramping to the maximum longitudinal velocity $v_{max}$ $$f \quad (\quad S[0].\text{inbraking} = 0 \, \&\, \&S[1].\text{inbraking} = 0$$
$$\&\, \&S[2].\text{inbraking} = 0 \, \&\, \&S[3].\text{inbraking} = 0$$
$$\&\, \&\Theta_{throttle} \leq 0 \, \&\, \&\tau_{axletorque} \leq p_{maxcoasttorq} \,)$$

(105)

$$\{ \quad v_{mrfraxref} = v_{max} + \frac{(v_{mrfraxref} - v_{max})}{\xi}; \quad \}$$

where $\Theta_{throttle}$ is the throttle angle, $\xi$ is a constant greater than 1 which is related to the ramping rate, $p_{maxcoastorq}$ is a threshold which is the maximum allowed torque for the vehicle to be coasted.

If the above four-wheel-coasting-conditions are not satisfied, the following two-front-wheel-coasting case is performed (one or two rear wheels in braking, or rear wheels in driving):

```
else if  (S[0].inbraking = 0 && S[1].inbraking = 0)
{        if (S[0].within_smallband = 1)
```

$$v_{mrfraxref} = v(0) + \frac{(v_{mrfraxref} - v(0))}{\xi};$$

else if (S[1].within_smallband = 1)

$$v_{mrfraxref} = v(1) + \frac{(v_{mrfraxref} - v(1))}{\xi};$$

else if ($\Theta_{throttle} \leq 0 \, \&\, \&\tau_{axletorque} \leq p_{maxtorquecost}$)
{   if ($v_{fmax} > p_{minvev}$)

$$v_{mrfraxref} = v_{fmax} + \frac{(v_{mrfraxref} - v_{fmax})}{\xi};$$

else $v_{mrfraxref} \mathrel{+}= dv_{mrfrax}\Delta T;$ }
else if ($\Theta_{throttle} > 0 \, || \, \tau_{axletorque} > p_{maxtorquecost}$)

$$v_{mrfraxref} = v_{fo} + \frac{(v_{mrfraxref} - v_{fo})}{\xi}; \quad \} \quad \} \quad (106)$$

If the four-wheel-coasting-condition and the two-wheel-coasting conditions are not satisfied, the two-rear-wheel coasting case is checked (one or two front wheels in braking):

else if (S[2].inbraking = 0 && S[3].inbraking = 0
&& $\Theta_{throttle} > 0 \, \&\, \& \, \tau_{axletorque} > p_{maxtorquecost}$)
{    if (S[2].within_smallband = 1)

$$v_{mrfraxref} = v(2) + \frac{(v_{mrfraxref} - v(2))}{\xi};$$

else if (S[3].within_smallband = 1)

$$v_{mrfraxref} = v(3) + \frac{(v_{mrfraxref} - v(3))}{\xi};$$

else if (S[0].inbraking = 1 && S[1].inbraking = 1)
{    if ($v_{fmax} > p_{minvel} \, \&\, \& \, |\rho(i_{ro})| \leq p_{slipratiobd}$)

$$v_{mrfraxref} = v_{rmax} + \frac{(v_{mrfraxref} - v_{rmax})}{\xi};$$

else $v_{mrfraxref} \mathrel{+}= dv_{mrfrax}\Delta T;$ } else $v_{mrfraxref} = v_{rav} + \frac{(v_{mrfraxref} - v_{rav})}{\xi}; \quad \}$ (107)

If the above four-wheel-coasting and two-wheel-coasting conditions are not satisfied, the single wheel coasting case for the front-left wheel is checked:

else if (S[0].within_middle = 1 && S[0].convergent_slip = 1
&& S[0].convergent_cpv = 1 && S[0].inbraking = 0
&& N(0) > $p_{fstatical}(1 - p_{nlloss})$) (108)

$$\{ \quad v_{mrfraxref} = v(0) + \frac{(v_{mrfraxref} - v(0))}{\xi}; \quad \}$$

If the four-wheel-coasting, two-wheel-coasting and front-left single-wheel-coasting conditions are all not satisfied, the front right wheel coasting condition is checked:

else if (S[1].within_middle = 1 && S[1].convergent_slip = 1
&& S[1].convergent_cpv = 1 && S[1].inbraking = 0
&& N(1) > $p_{fstatical}(1 - p_{nlloss})$) (109)

$$\{ \quad v_{mrfraxref} = v(1) + \frac{(v_{mrfraxref} - v(1))}{\xi}; \quad \}$$

If all the above checked conditions are not satisfied, the rear-right wheel for coasting conditions is then checked:

$$\text{else if } (S[2].\text{within\_middle} = 1 \&\& S[2].\text{convergent\_slip} = 1$$
$$\&\& S[2].\text{convergent\_cpv} = 1 \&\& S[2].\text{inbraking} = 0$$
$$\&\& N(S) > p_{fstatical}(1 - p_{nlloss}) \&\& \Theta_{throttle} \leq 0 \quad (110)$$
$$\&\& \tau_{axletorque} > p_{maxtorquecoast} \&\& |\beta_{mrfra}| \leq p_{ssamidbd})$$

$$\left\{ v_{mrfraxref} = v(2) + \frac{(v_{mrfraxref} - v(2))}{\xi}; \right\}$$

If none of the four-wheel-coasting, two-wheel-coasting, and front-left, front-right and rear-left single wheel coasting conditions are satisfied, the front right wheel for coasting is then checked:

$$\text{else if } (S[3].\text{within\_middle} = 1 \&\& S[3].\text{convergent\_slip} = 1$$
$$\&\& S[3].\text{convergent\_cpv} = 1 \&\& S[3].\text{inbraking} = 0$$
$$\&\& N(3) > p_{fstatical}(1 - p_{nlloss}) \&\& \Theta_{throttle} \leq 0 \quad (111)$$
$$\&\& \tau_{axletorque} > p_{maxtorquecoast} \&\& |\beta_{mrfra}| \leq p_{ssamidbd})$$

$$\left\{ v_{mrfraxref} = v(3) + \frac{(v_{mrfraxref} - v(3))}{\xi}; \right\}$$

If the vehicle is not in 4×2 mode (RWD mode as discussed before, FWD can be similarly considered), but in 4×4 mode (that is, in all-wheel-drive or torque-on-demand or 4-high or 4-low modes), the following check is performed for a single wheel condition regardless what the other three wheels are doing (could be braking, driving or coasting)

else
{
   if $(S[0].\text{within\_smallband} = 1)$    $v_{mrfraxref} = v(0) + \frac{v_{mrfraxref} - v(0)}{\xi};$ else if $(S[1].\text{within\_smallband} = 1)$    $v_{mrfraxref} = v(1) + \frac{v_{mrfraxref} - v(1)}{\xi};$   (112)

else if $(S[2].\text{within\_smallband} = 1)$    $v_{mrfraxref} = v(2) + \frac{v_{mrfraxref} - v(2)}{\xi};$ else if $(S[3].\text{within\_smallband} = 1)$    $v_{mrfraxref} = v(3) + \frac{v_{mrfraxref} - v(3)}{\xi};$ If none of the above single wheel condition is satisfied, the following convergent wheel speed case and the four wheel coasting case is used:

else if $(|v_{max} - v_{min}| < p_{smith} |v_{max} + v_{min}|)$    $v_{mrfraxref} = v_{mid} + \frac{v_{mrfraxref} - v_{mid}}{\xi};$ else if $(S[0].\text{inbraking} = 0 \&\& S[1].\text{inbraking} = 0$
   $\&\& S[2].\text{inbraking} = 0 \&\& S[3].\text{inbraking} = 0$   (113)
   $\&\& (\Theta_{throttle} \leq 0 \&\& \tau_{axletorque} \leq p_{maxtorquecoast}))$ $$\left\{ v_{mrfraxref} = (v_{max} + v_{min})/2 + \frac{v_{mrfraxref} - (v_{max} + v_{min})/2}{\xi}; \right\}$$

When the vehicle is driven with throttle off, the following computations are conducted:

else if $(\Theta_{throttle} \leq 0 \&\& \tau_{axletorque} \leq p_{maxtorquecoast}))$ (114)
{   if (S[0].within_smallband = 1)

$$v_{mrfraxref} = v(0) + \frac{v_{mrfraxref} - v(0)}{\xi};$$

else if ( S[1].within_smallband = 1)

$$v_{mrfraxref} = v(1) + \frac{v_{mrfraxref} - v(1)}{\xi};$$

else if (S[2].within_smallband = 1)

$$v_{mrfraxref} = v(2) + \frac{v_{mrfraxref} - v(2)}{\xi};$$

else if (S[3].within_smallband = 1)

$$v_{mrfraxref} = v(3) + \frac{v_{mrfraxref} - v(3)}{\xi};$$

else if $(|v_{max} - v_{min}| < p_{smith} |v_{max} - v_{min}|))$ $$v_{mrfraxref} = v_{mid} + \frac{v_{mrfraxref} - v_{mid}}{\xi};$$

else  $v_{mrfraxref} = v_{max} + \frac{v_{mrfraxref} - v_{max}}{\xi};$   }

If there are no braking on any of the wheels, then the following is performed:

else if (S[0].inbraking = 0 && S[1].inbraking = 0
      && S[2].inbraking = 0 && S[3].inbraking = 0 )

{   if ( S[0].within_smallband= 1)   $v_{mrfraxref} = v(0) + \frac{v_{mrfraxref} - v(0)}{\xi};$ else if ( S[1].within_smallband = 1)

$$v_{mrfraxref} = v(1) + \frac{v_{mrfraxref} - v(1)}{\xi};$$

else if (S[2].within_smallband = 1)

$$v_{mrfraxref} = v(2) + \frac{v_{mrfraxref} - v(2)}{\xi};$$

else if (S[3].within_smallband = 1)

$$v_{mrfraxref} = v(3) + \frac{v_{mrfraxref} - v(3)}{\xi};$$

else if $(|v_{max} - v_{min}| < |v_{max} + v_{min}| p_{smith})$ $$v_{mrfraxref} = v_{mid} + \frac{v_{mrfraxref} - v_{mid}}{\xi};$$

(115)

else  $v_{mrfraxref} = v_{min} + \frac{v_{mrfraxref} - v_{min}}{\xi};$ }

If none of the above conditions is satisfied, the integration of the time derivative of the longitudinal velocity along the moving road frame is conducted:

else
    $v_{mrfraxref} += dv_{mrfrax} * \Delta T;$
}
}   (116)
}

For a potential inside wheel/wheel lifting case:

else
{   if ( $\Theta_{throttle} \leq 0 \&\& \tau_{axletorque} \leq p_{maxtorquecoast}$
      && $dv_{mrfraxf} \leq 0 \&\& dv_{mrfraxf} > -p_{mindeepbrakedvc}$
      && $|\rho(i_{ro})| \leq p_{slipratiobd}$ $\{ v_{mrfraxref} = v_{ro} + \frac{v_{mrfraxref} - v_{ro}}{\xi}; \}$ else if ( ($\tau_{axletorque} \geq p_{mintorquehmu} || \Theta_{throttle} \geq$   (117)
$p_{minthrottlehmu}$)
      && $dv_{mrfraxf} > 0 \&\& dv_{mrfraxf} \leq p_{mindeepbrakedvc}$)

$$v_{mrfraxref} = v_{fmax} + \frac{v_{mrfraxref} - v_{fmax}}{\xi};$$

else $v_{mrfraxref} += dv_{mrfrax} * \Delta T;$
}
}

In step 918, The longitudinal velocity may then be computed based on the reference longitudinal velocity and a washout integration of the derivative of the longitudinal velocity such that the non-smooth switch in the reference longitudinal velocity is if ($v_{xmrf} \geq p_{smspd}$)
{   if(($v_{max} - v_{min}) > p_{smpc}(v_{max} + v_{min})$)
    { //Compute High Frequency Portion of Longitudinal Velcity
      $v_{mrfxdyn} = p_{adid} v_{mrfxdyn} + p_{adin} dv_{mrfrax};$
    //Compute Low Frequency Portion of Longitudinal Velocity
      $v_{mrfxss} = p_{adid} v_{mrfxss} + p_{sccn} v_{mrfraxref};$
      $v_{mrfx} = v_{mrfxdyn} + v_{mrfxss};$
      $v_{mrfxls} = v_{mrfx}; v_{mrfyls} = v_{mrfy}; \}$
    //Compute Longitudinal Velocity During Convergent Wheel Speeds
    else if (($v_{max} - v_{min}) \leq p_{smpc}(v_{max} + v_{min})$)

$\{ v_{mrfx} = v_{mid} + \frac{v_{mrfx} - v_{mid}}{\xi};$ $v_{mrfxss} = v_{mrfx} + \frac{v_{mrfxss} - v_{mrfx}}{\xi};$ $v_{mrfxdyn} = v_{mrfx} - v_{mrfxss};$ $v_{mrfxls} = v_{mrfx}; v_{mrfyls} = v_{mrfy}; \}$   (118)
}

If during low vehicle speed, else
{ //Compute Longitudinal Velocity During Low Speed Driving
  $v_{mrfyls} += dv_{mrfray} \Delta T;$
  $dv_{mrfxls} = a_{mrfxaug} + \omega_{mrfz} v_{mrfyls};$ -continued $v_{mrfxls} \mathrel{+}= dv_{mrfrax} \Delta T;$
if $(v_{mrfxls} < 0 \ \& \ \& v_{mrfxls} \geq -v_{max})$
　　$v_{mrfxls} = -v_{max};$
if $(v_{mrfxls} \geq P_{smspd})$
　　$v_{mrfxls} = P_{smspd};$
$v_{mrfxdyn} = P_{adid}v_{mrfxdyn} + P_{adin}dv_{mrfxls};$
$v_{mrfxss} = P_{adid}v_{mrfxss} + P_{sscn}v_{mrfxls};$
$v_{mrfx} = v_{mrfxdyn} + v_{mrfxss};$
} (119)

The derivative of the longitudinal velocity based on the computed longitudinal velocity $dv_{mrfx} = p_{dervd1} dv_{mrfx-1} - p_{dervd2} dv_{mrfx-2} + p_{dervn}(v_{mrfx} - v_{mrfx-2});$ $dv_{mrfx-2} = dv_{mrfx-1};$ $dv_{mrfx-1} = dv_{mrfx};$ $v_{mrfx-2} = v_{mrfx-1};$ $v_{mrfx-1} = v_{mrfx};$ (120)

The Wheel Speed Sensor Scaling Factor

In step 920, the wheel speeds scaling factors are determined such that the products of the scaling factors and the wheel speed sensor outputs provide the true linear speeds of the wheel centers during the wheels' coasting (free rolling). The final individual scaling factors involve several separated scaling factor computations, which include the dynamic scaling factors and several static scaling factors including: the left-to-right delta scaling factor at front axle; the left-to-right delta scaling factor at rear axle; the front-to-rear reference delta scaling factor; the global scaling factors.

The static scaling factors are calculated through several sequential computations.

In the first step, the left-to-right delta scaling factor at front axle or at the rear axle are first identified based on the individual longitudinal velocities calculated from the individual wheel speed sensor output, to try to balance the left and right wheel speed at the same axle during normal or costing wheel conditions.

In the second step, the reference wheel at front and the reference wheel at the rear are picked to compute the delta scaling factor, which is called the front-to-rear reference delta scaling factor.

In the third step, a reference wheel which does not need to have any scaling factor adjustment and which is one of the front and rear reference wheels used in step 2. The global scaling factor is calculated based on this reference wheel through matching its acceleration with the vehicle's longitudinal acceleration.

In the fourth step, the final static scaling factors are generated based on the delta scaling factors and the global scaling factors calculated in step 1 to 3.

In parallel to the static scaling factor determination, the dynamic scaling factors are determined based on the dynamic event.

The linear wheel speeds are used to describe the velocities of the centers of the wheels along their longitudinal directions. This information can be used to assess the longitudinal wheel slips used in brake and traction controls (such as ABS, TCS, RSC and ESC) and used to determine the longitudinal velocity of the vehicle. Such linear wheel speeds are translational velocities and cannot be directly measured unless expensive velocity sensors are used. The wheel speed sensor was invented for this purpose, however, it is rather misleading to call the output from a wheel speed sensor as the linear wheel speed since the wheel speed sensor really measures the wheels rotational speed and its output is the product of such rotational rate and the nominal rolling radius of the wheel. When the wheel's true rolling radius differs from the nominal value, the wheel speed sensor output will not be able to reflect the true vehicle velocity.

During the travel of a vehicle, many error sources contribute to the variation of the rolling radii and the following lists some of them: low inflation pressure in the tire of the interested wheel (the lower pressure, the smaller the rolling radius); uneven static loading distribution in the vehicle caused unevenly distributed rolling radii; the spare tire usage (the spare tire usually has a rolling radius which is about 15% to 17% smaller than the nominal rolling radius); the off-spec tire usage (customers sometimes use large off-spec tires, which have larger rolling radii); lateral load transfer during dynamic maneuvers such as potential RSC event (the load transfer may generate about 5% reduction in tire rolling radii for outside wheels during a one or two wheel lift event).

The above error sources will introduce errors in wheel linear speed determination, which further affects the accuracy of both wheel and the vehicle state estimations. For example, one of the important wheel states is the wheel's longitudinal slip ratio, its determination depends on the linear speed of the wheel and the longitudinal velocity of the vehicle. An erroneous computation in the wheel and vehicle states will ultimately cause false activations in controls or undermine the effectiveness of the control functions. Therefore it is desirable to counteract to the afore-mentioned error sources by adaptively adjusting the wheel scaling factors, which are the ratios between the true wheel rolling radii and the nominal wheel rolling radii, so as to adaptively calibrate the wheel speeds.

By using the nominal rolling radius, the wheel speed sensor outputs can be expressed as $w_i = \omega_{is} R_i$ (121)

for i=0, 1, 2, 3 (indicating front-left, front-right, rear-left and rear-right wheels), where $w_i$ is the well-known (but misleading) wheel speed sensor output for the ith wheel which depends on its rolling radius; $\omega_{is}$ is the rotational velocity of the ith wheel which is independent of its rolling radius; $R_i$ is the nominal rolling radius of the ith wheel. Usually the front two wheels and the rear two wheels have the similar rolling radii $R_0 = R_1 = R_f$ $R_2 = R_3 = R_r$ (122)

If the true rolling radius of the ith wheel is denoted as $r_i$, then the ith wheel speed scaling factor is defined as $$\chi_i = \frac{r_i}{R_i}$$ (123)

Due to the computational advantage, instead of using (123), the delta scaling factors are used. The left-to-right delta scaling factors for the front wheels ($\Delta\chi_f$) and rear wheels ($\Delta\chi_r$) are defined as $$\Delta\chi_f = \frac{r_0 - r_1}{R_f} \quad (124)$$

$$\Delta\chi_r = \frac{r_2 - r_3}{R_r}$$

The front-to-rear delta scaling factor is defined as $$\Delta\chi_{f2r} = \frac{2(r_{ireff} - r_{irefr})}{R_f + R_r} \quad (125)$$

where ireff is one of the front wheels which is called the front reference wheel, whose rolling radius does not need to be adjusted; irefr is one of the rear wheels which is called the rear reference wheel, whose rolling radius does not need to be adjusted.

The wheel scaling factor defined in (123) can also be determined though longitudinal acceleration alignment as in the following $$\kappa_g = \frac{\dot{v}_{x-MRF}}{\dot{v}_i} \text{ if } \dot{v}_i \neq 0 \quad (126)$$

where $\dot{v}_{x-MRF}$ is the time derivative of the longitudinal velocity obtained from the acceleration sensor signals and the calculated vehicle attitudes. Notice that $\dot{v}_{x-MRF}$ is projected on the same plane on which the wheel travels. $\dot{v}_i$ is the time derivative of the longitudinal velocity from the ith wheel speed sensor (but the turn effect, or say the difference due to vehicle turning is compensated).

Since the rolling radii are not known prior to the computation, (123)-(125) are not useful for the scaling factor computations. By using the sensed wheel angular velocities (wheel speed sensor outputs) and the longitudinal velocity at the center of the wheels, the rolling radii in (123)-(125) can be further expressed as $$r_0 = \frac{v_{wc0}}{w_0} R_f; r_1 = \frac{v_{wc1}}{w_1} R_f \quad (127)$$

$$r_2 = \frac{v_{wc2}}{w_2} R_r; r_3 = \frac{v_{wc3}}{w_3} R_r$$

where $v_{wci}$ is the linear longitudinal velocity of the center of the ith wheel. Therefore (124) can be expressed as $$\Delta\chi_f = \frac{v_{wc0}}{w_0} - \frac{v_{wc1}}{w_1} \quad (128)$$

$$\Delta\chi_r = \frac{v_{wc2}}{w_2} - \frac{v_{wc3}}{w_3}$$

(128) is still not particularly useful due to the fact that $v_{wci}$ are unknowns. Considering if the vehicle is driven on a straight road, ideally all $v_{wci}$s will be the same, hence if the following relative computations are introduced $$\Delta\kappa_f = \frac{r_0 - r_1}{(r_0 + r_1)/2} \quad (129)$$

$$\Delta\kappa_r = \frac{r_2 - r_3}{(r_2 + r_3)/2}$$

$$\Delta\kappa_{f2r} = \frac{(r_i - r_j)}{(r_i + r_j)/2}$$

The unknowns $v_{wci}$s could be eliminated to obtain the following computations which only depend on the known variables $$\Delta\kappa_f = \frac{w_1 - w_0}{(w_1 + w_0)/2} \quad (130)$$

$$\Delta\kappa_r = \frac{w_3 - w_2}{(w_3 + w_2)/2}$$

$$\Delta\kappa_{f2r} = \frac{(w_{ireff} - w_{irefr})}{(w_{ireff} + w_{irefr})/2}$$

Notice that there are two issues associated with (130). The first issue is the contamination of the vehicle turning effect. That is, when a vehicle is driven in a turn, the outside wheels travel more distances in order to catch up with the inside wheels and they speed up, which would look much the same as the outside wheels have smaller rolling radii. However, if the corner wheel speed sensor outputs are transferred to the same location, this turning effect can be eliminated. The second issue is that (130) is clearly the determination of the relative scaling factors with respect to the average wheel speed of the right and the left wheels for $\Delta\kappa_f$ and $\Delta\kappa_r$, and with respect to the average wheel speed of the front and rear reference wheels for $\Delta\kappa_{f2r}$.

The scaling factor difference of one wheel with respect to the other is important. A better definition for the front delta scaling factor would be $$\Delta\kappa_f = \frac{w_1 - w_0}{\max(w_1, w_0)} \quad (131)$$

However due to the later least computation method, if the noises in wheel speeds cause different wheels picked for the max, the above may not be robust. Instead of using (131), a correction to the computation (130) is conducted as in the following $$\Delta\kappa'_f = \frac{w_1 - w_0}{(w_1 + w_0)/2}, \Delta\kappa_f = \frac{\Delta\kappa'_f}{1 - |\Delta\kappa'_f|/2} \quad (132)$$

$$\Delta\kappa'_r = \frac{w_3 - w_2}{(w_3 + w_2)/2}, \Delta\kappa_r = \frac{\Delta\kappa'_r}{1 - |\Delta\kappa'_r|/2}$$

$$\Delta\kappa'_{f2r} = \frac{(w_j - w_i)}{(w_j + w_i)/2}, \Delta\kappa_{f2r} = \frac{\Delta\kappa'_{f2r}}{1 - |\Delta\kappa'_{f2r}|/2}$$

Overcoming the first issue by restricting the computation straight line driving not only limits the screening conditions for the computations but could also causes robustness issues, since a true straight line driving is hard to be determined. In order to solve the first issue, using the wheel speeds with removed turning effects is considered by compensating the yaw rate sensor signals. That is, the individual longitudinal velocities are worked with, which are calculated by transferring the wheel speed signals to the same location. In order to overcome the second issue, the acceleration calibration as in (136) will be used to compute portion of the scaling factor which could not be determined through $\Delta\kappa_f$, $\Delta\kappa_r$ and $\Delta\kappa_{f2r}$.

An individual longitudinal velocity is defined as the one which measures the vehicle longitudinal velocity at the rear axle location which is calculated by transferring the four individual wheel speed sensor signals to same rear axle location. The following provides a computation of the individual longitudinal velocities $$v_0 = \frac{w_0 + \omega_{mrfz}[t_f\cos(\delta) - b\sin(\delta)]}{\cos(\delta) + \sin(\beta)\sin(\delta)}$$

$$v_1 = \frac{w_1 + \omega_{mrfz}[t_f\cos(\delta) - b\sin(\delta)]}{\cos(\delta) + \sin(\beta)\sin(\delta)}$$

$$v_2 = w_2 + ct_r$$

$$v_3 = w_3 - \omega_{mrfz}t_r$$

(133)

where $t_f$ and $t_r$ are the half tracks for the front and rear axles, b is the vehicle base, $\omega_{mrfz}$ is the vehicle's yaw rate projected on the axle which is perpendicular to the plane on which the wheels are traveling, which is called moving road frame.

Based on the above individual longitudinal velocities, compute the delta scaling factors may be approximately computed as in the following $$\Delta\kappa'_f = \frac{v_0 - v_1}{(v_0 + v_1)/2}, \quad \Delta\kappa_f = \frac{\Delta\kappa'_f}{1 - |\Delta\kappa'_f|/2}$$

$$\Delta\kappa'_r = \frac{v_2 - v_3}{(v_2 + v_3)/2}, \quad \Delta\kappa_r = \frac{\Delta\kappa'_r}{1 - |\Delta\kappa'_r|/2}$$

(134)

Using the computations from (134) to adjust the wheel speeds leads to the following $$w_i^{comp} = (1 - |\Delta\kappa_f|)w_i$$

$$w_j^{comp} = (1 - |\Delta\kappa_r|)w_j$$

(135)

After adjustment in (135) is done, the compensated wheel speeds in step 922 will generate the same individual wheel longitudinal velocities in the front two wheels, or the same individual wheel longitudinal velocities in the rear two wheels.

Notice that the balanced individual longitudinal velocities could still be different from the true values due to the relative feature of the computation method in (134). Hence there is a need to do further compensation so as to balance the front and the rear individual longitudinal velocities.

Let ireff be a front reference wheel which is a wheel used as a reference to balance the front two wheels, and irefr be a rear reference wheel, which is used as a reference to balance the rear two wheels, then $$\Delta\kappa'_{f2r} = 2\frac{v_{ireff} - v_{irefr}}{v_{ireff} + v_{irefr}}$$

(136)

-continued $$\Delta\kappa_{f2r} = \frac{\Delta\kappa'_{f2r}}{1 - |\Delta\kappa'_{f2r}|/2}$$

Due to the noise and disturbance in the wheel speed sensor output, none of the computations in (134) and (136) have practical significance. In order to removing such noises and disturbances factors, a least square parameter identification method is used here. The least square parameter identification method is an averaging method which tries to find the optimal parameters to fit certain amount of data point. The least square algorithm for computing $\Delta\kappa_f$ in (134) can be expressed as in the following if (front wheel screening condition holds)
{ $n_f = n_f + 1$;
    if($n_f < p_{totlsstesps}$)
    { $A_f = A_f + (v_0 + v_1)^2/4$;
      $B_f = B_f + (V_0^2 - v_1^2)/2$; }
    else $\left\{ \Delta\kappa_f = \max\left(-p_{deviation}, \min\left(p_{deviation}, \frac{B_f}{A_f}\right)\right); \right.$ $\Delta\kappa'_f = \frac{\Delta\kappa_f}{1 - |\Delta\kappa_f|/2}$;

$A_f = 0; B_f = 0; N_f = 0$;
    $\Delta\kappa_f = p_{dlpf}\Delta\kappa_f + (1 - p_{dlpf})\Delta\kappa'_f;$ }
}

(137)

The least square algorithm for computing $\Delta\kappa_r$ in (134) can be expressed as in the following if (rear wheel screening condition holds)
{ $n_r = n_r + 1$;
    if($n_r < p_{totlsstesps}$)
    { $A_r = A_r + (v_2 + v_3)^2/4$;
      $B_r = B_r + (v_2^2 - v_3^2)/2$; }
    else $\left\{ \Delta\kappa_r = \max\left(-p_{deviation}, \min\left(p_{deviation}, \frac{B_f}{A_f}\right)\right); \right.$ $\Delta\kappa'_r = \frac{\Delta\kappa_r}{1 - |\Delta\kappa'_r|/2}$;

$A_r = 0; B_r = 0; N_r = 0$;
    $\Delta\kappa_r = p_{dlpf}\Delta\kappa_r + (1 - p_{dlpf})\Delta\kappa'_r;$ }
}

(138)

Using the delta scaling factors calculated in (137) and (148), the individual scaling factors of the four wheels could be assigned as in the following if only the smaller wheel is considered if ($\Delta k_f \geq 0$ and $\Delta k_f \geq 0$ )
{  $k_{10} = 1 - \Delta k_f$; $k_{11} = 1$;
   $k_{12} = 1 - \Delta k_r$; $k_{13} = 1$;
   ireff = 1; irefr = 3;  }
else if ($\Delta k_f \leq 0$ and $\Delta k_r \leq 0$ )
{  $k_{10} = 1 + \Delta k_f$; $k_{11} = 1$;
   $k_{12} = 1$; $k_{13} = 1 + \Delta k_r$;

-continued

```
            ireff = 0; irefr = 2;   }
        else if (Δk_f ≤ 0 and Δk_r ≥ 0 )
        {   k_10 = 1 + Δk_f; k_11 = 1;
            k_12 = 1 − Δk_r; k_13 = 1;
            ireff = 0; irefr = 3;   }
        else
        {   k_10 = 1 − Δk_f; k_11 = 1;
            k_12 = 1; k_13 = 1 + Δk_r;                          (139)
            ireff = 1; irefr = 2; }
```

The least square algorithm for computing $\Delta\kappa_{f2r}$ in (134) can be expressed as in the following

```
if (front and rear reference wheels screening condition holds)
{ n_f2r = n_f2r + 1;
    if(n_f2r < P_totlsstesps)
    { A_f2r = A_f2r + (v_ireff + v_irefr)² /4;
      B_f2r = B_f2r + (v_ireff² − v_irefr²)/2; }
    else
```

$$\left\{ \Delta\kappa_{f2r} = \max\left(-p_{deviation}, \min\left(p_{deviation}, \frac{B_{f2r}}{A_{f2r}}\right)\right); \right.$$

$$\Delta\kappa'_{f2r} = \frac{\Delta\kappa'_{f2r}}{1 - |\Delta\kappa'_{f2r}|/2};$$

$A_{f2r} = 0; B_{f2r} = 0; N_{f2r} = 0;$
$\Delta\kappa_{f2r} = p_{dlpf}\Delta\kappa_{f2r} + (1 - p_{dlpf})\Delta\kappa'_{f2r};$ } (140)
}

Using the delta scaling factor calculated in (140), the individual scaling factors of the four wheels due to the mismatch between the front reference wheel and the rear reference wheel could be assigned as in the following if only the smaller wheel is considered

```
        if (Δk_f2r >= 0)
        {   k_20 = 1−Δk_f2r; k_21 = 1−Δk_f2r;
            k_22 = 1; k_23 = 1;
            iref = irefr; }                                     (141)
        else
        {   k_20 = 1; k_21 = 1−Δk_f2r;
            k_22 = 1 + Δk_f2r; k_23 = 1+Δk_f2r;
            iref = ireff; }
```

After the adjustment, all the four wheels can have the exact same wheel speeds in a straight driving, however, they could be different from the true wheel rolling radius since the balances are conducted with respect to the reference wheels. The reference wheel is denoted as iref, which could be either the front reference wheel ireff or the rear reference wheel irefr.

If the sensor based longitudinal acceleration is $\dot{v}_{x-MRF}$ the following formula $$\dot{v}_{x-MRF} = a_{x-MRF} + \omega_{z-MRF}v_{y-MRF} - \omega_{y-MRF}v_{y-MRF}v_{z-MRF} + g\sin\theta_{y-MRF}$$ (142)

and the time derivative of $v_{iref}$ as $\dot{v}_{iref}$, then (126) can be expressed as in the following $$\kappa_g = \frac{a_{x-MRF} + \omega_{z-MRF}v_{y-MRF} - \omega_{y-MRF}v_{z-MRF} + g\sin\theta_{y-MRF}}{\dot{v}_{iref}}$$ (143)

A conditional least square parameter identification method for (143) can be expressed as in the following

```
if (screening condition holds)
{ n_g = n_g + 1;
    if (n_g < P_totlsstesps)
    { A_g = A_g + v̇²_x-MRF;
      B_g = B_f + v̇_x-MRF·v̇_iref; }                            (144)
    else
    { k'_g = max(−P_deviation, min(P_deviation, B_g / A_g));
      A_g = 0; B_g = 0; N_g = 0;
      Δk_g = P_dlpf Δk_f + (1− P_dlpf)Δk_g; }
}
```

If $\Delta\kappa_g$ is available, then the final static scaling factors can be calculated as in the following $$\kappa_{stati} = \kappa_{1i}\kappa_{2i}\kappa_g, i=0, 1, 2, 3$$ (145)

During aggressive maneuver, for example in an RSC event, the vehicle loading is heavily biased towards the outside wheels, especially during one or two wheel lifting cases. In those cases, there are significant normal loading increases on outside wheels (up to 100% increase in double wheel lift case). Let the tire vertical stiffness be $K_t$, the vehicle total mass be $M_t$, the distance of the c.g. of the vehicle with respect to the front axle be $b_f$ and with respect to front axle be $b_r$, wheel base be b, then the vertical compression of the front and rear wheels for double wheel lift case can be calculated as $$\Delta r_f = \frac{b_r M_t g}{bK_t}$$ (146)

$$\Delta r_r = \frac{b_r M_t g}{bK_t}$$

and in normal driving conditions, they assume the values $$\Delta r_{f0} = \frac{b_r M_r g}{2bK_t}$$ (147)

$$\Delta r_{r0} = \frac{b_r M_t g}{2bK_t}$$

Hence the incremental vertical tire compression changes are the difference between (146) and (147) If taking some common values such as $$M_t = 2704 \text{ kg}, K_t = 300000\frac{N}{m}, b_f = 1.451m,$$ (148)
$b_r = 1.573m, b = 3.024m,$
then -continued $$\Delta r_f - \Delta r_{f0} = \frac{b_r M_t g}{2bK_r} = 0.021m = 5.57\% \text{ of } R_f \quad (149)$$

$$\Delta r_r - \Delta r_{r0} = \frac{b_r M_t g}{2bK_t} = 0.023m = 6.10\% \text{ of } R_r$$

where $R_f = R_r = 0.377m$ denote the nominal rolling radii of the tires. Hence for double wheel lift case, the outside tires could have around 5% reduction in rolling radius. For this reason, a scaling factor is computed to compensate this

```
if(|θ_xr| ≤ p_35th p_rollgrad)
{   κ_dyn0 = 1; κ_dyn1 = 1; κ_dyn2 = 1; κ_dyn3 = 1; }
else
{   if (θ_xr < )
```

$$\left\{ \kappa_{dyn0} = \max\left(1 - p_{deltalatamax}, 1 - \frac{|\theta_{xr}| - p_{35th}p_{rollgrad}}{p_{40th}p_{rollgrad}} p_{deltalatamax}\right); \right.$$

$$\kappa_{dyn2} = \kappa_{dyn0}; \kappa_{dyn3} = 1; \kappa_{dyn3} = 1; \quad \} \quad (150)$$
else $$\left\{ \kappa_{dyn1} = \max\left(1 - p_{deltalatamax}, 1 - \frac{|\theta_{xr}| - p_{35th}p_{rollgrad}}{p_{40th}p_{rollgrad}} p_{deltalatamax}\right); \right.$$

$$\kappa_{dyn3} = \kappa_{dyn1}; \kappa_{dyn0} = 1; \kappa_{dyn2} = 1; \quad \}$$
} where $\kappa_{dyni}$ (for i=0, 1, 2, 3) denotes the dynamic scaling factor for the ith wheel.

The final individual scaling factors can be calculated as in the following $$\kappa_i = \kappa_{stati}\kappa_{dyni} = \kappa_{1i}\kappa_{2i}\kappa_g\kappa_{dyni}, \, i=0, 1, 2, 3 \quad (151)$$

In the following example the above computations can be used for compensating the wheel speed sensor signals. The front-left wheel and the rear left wheels are wheels presumed to have smaller rolling radii, then the compensated wheel speeds using the above two stage compensations can be expressed as in the following for $\Delta\kappa_{f2r} < 0$ case $$w_0^{comp} = (1-|\Delta\kappa_f|)(1-|\Delta\kappa_{f2r}|)w_0$$

$$w_1^{comp} = (1-|\Delta\kappa_{f2r}|)w_1$$

$$w_2^{comp} = (1-|\Delta\kappa_r|)w_2$$

$$w_3^{comp} = w_3 \quad (152)$$

and for $\Delta\kappa_{f2r} \geq 0$ case $$w_0^{comp} = (1-|\Delta\kappa_f|)w_0$$

$$w_1^{comp} = w_1$$

$$w_2^{comp} = (1-|\Delta\kappa_r|)(1-|\Delta\kappa_{f2r}|)w_2$$

$$w_3^{comp} = (1-|\Delta\kappa_{f2r}|)w_3 \quad (153)$$

It can be seen that in either case, there is one wheel which does not need to be compensated (rear-right wheel for (151) and front right wheel for (152)). If considering $\kappa_g$ and $\kappa_{dyni}$, further compensation for (160) may be achieved as in the following $$w_0^{comp} = \kappa_g(1-|\Delta\kappa_f|)(1-|\Delta\kappa_{f2r}|)\kappa_{dyn0}w_0 = \kappa_0 w_0$$

$$w_1^{comp} = \kappa_g(1-|\Delta\kappa_{f2r}|)\kappa_{dyn1}w_1 = \kappa_1 w_1$$

$$w_2^{comp} = \kappa_g(1-|\Delta\kappa_r|)\kappa_{dyn2}w_2 = \kappa_2 w_2$$

$$w_3^{comp} = \kappa_g\kappa_{dyn3}w_3 = \kappa_3 w_3 \quad (154)$$

or for (153) as in the following $$w_0^{comp} = \kappa_g(1-|\Delta\kappa_f|)\kappa_{dyn0}w_0 = \kappa_0 w_0$$

$$w_1^{comp} = \kappa_g\kappa_{dyn1}w_1\kappa_1 w_1$$

$$w_2^{comp} = \kappa_g(1-|\Delta\kappa_r|)(1-|\Delta\kappa_{f2r}|)\kappa_{dyn2}w_2 = \kappa_2 w_2$$

$$w_3^{comp} = \kappa_g(1-|\Delta\kappa_{f2r}|)\kappa_{dyn3}w_3 = \kappa_3 w_3 \quad (155)$$

The detailed algorithm together with the screening conditions used in the algorithms may be found in the detailed logic section.

Figure 12A:
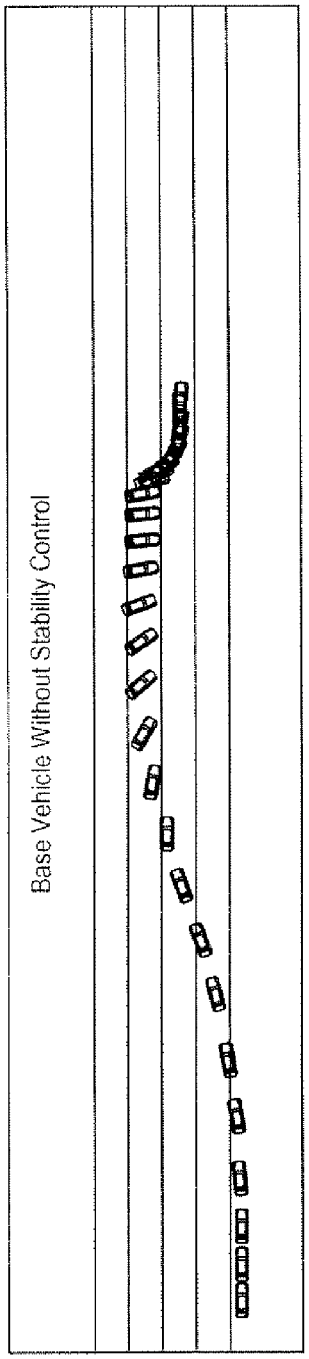
FIGS. 12A, 12B and 12C illustrate a vehicle without stability control, a vehicle with traditional stability control, and a vehicle with advanced stability control according to the present invention, respectively.
Figure 12B:
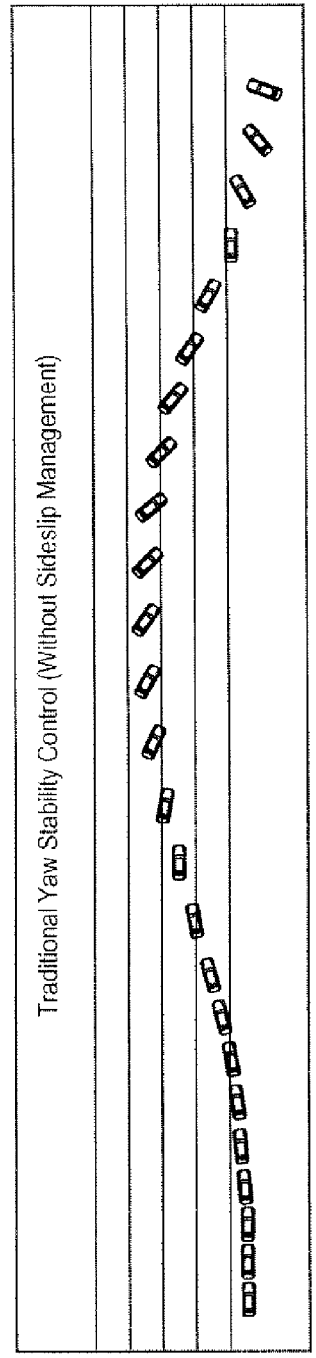
Figure 12C:
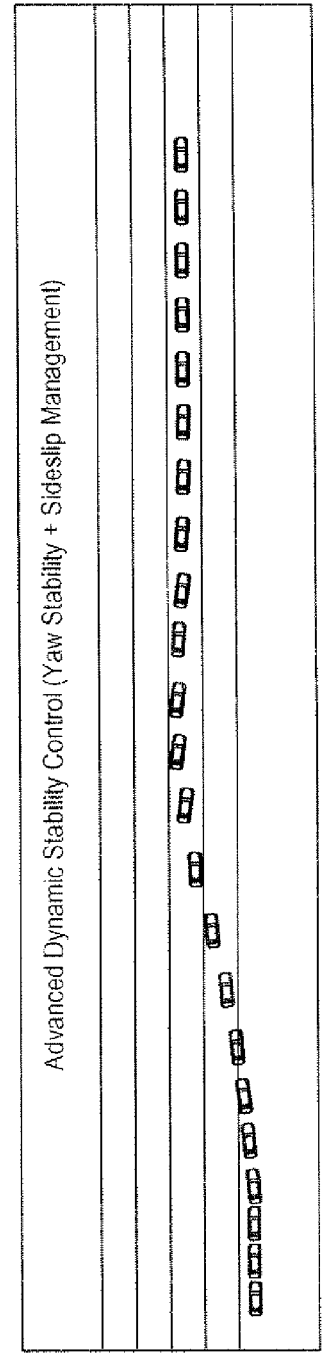

Referring now also to FIGS. 12A, 12B, and 12C, one advantage of the present invention is illustrated. As mentioned above, the longitudinal velocity, the lateral velocity determined above may be used to determine the sideslip of the vehicle. In FIG. 12A, a base vehicle without stability control is illustrated. As can be seen, before achieving stability the vehicle may completely slide sideways. In a traditional stability control system shown in 12B, the vehicle may slide sideways and leave the roadway before regaining control. This is because traditional stability control may be too late and the vehicle may overshoot the desired course. Using the present invention illustrated in 12C, an advance yaw stability control using precise sideslip information reacts quicker than standard stability control so that the desired course or lane may be maintained.

The Vehicle Sideslip Angle at the Rear Axle

As mentioned above, the sideslip angle $\beta_{LSC}$ of the vehicle body and its time derivative are used in LSC. $\beta_{LSC}$ is the sideslip angle $\beta_{mrfra}$ of the vehicle body at its real axle location, measured along the moving road frame, measures the lateral stability of a moving vehicle. The aforementioned sideslip angle can be defined as in the following $$\beta_{LSC} = \tan\left(\frac{v_{mrfray}}{v_{mrfrax}}\right) \quad (156)$$

where $v_{mrfrax}$ and $v_{mrfray}$ are the longitudinal and lateral velocities of the vehicle body at its rear axle measured along the x axis and the y-axis of the moving road frame.

$\beta_{LSC}$ thus defined can be related to the signals calculated from the sensor measurements such as the lateral acceleration, the yaw rate, the bank and slope angles of the moving road frame and the reference velocity as in the following:

$$d\beta_{LSC2} = \left[-\omega_{mrfz} + \frac{\alpha_{mrfya}v_{mrfrax} - g\sin\theta_{mrfx}\cos\theta_{mrfy}}{v_{mrfrax}}\right] \quad (157)$$

$$[1 + \cos(\beta_{LSC2})] - \frac{v_{mrfrax}}{v_{mrfrax}}\sin(\beta_{LSC2})$$

$$\beta_{LSC} = \frac{\beta_{LSC2}}{2}$$

Both (156) and (157) can be used to compute $\beta_{LSC}$. (146) requires the computation of the lateral velocity while (157) does not need to have a separate computation of lateral velocity. In the following equation (157) is used to compute $\beta_{LSC}$. Due to the inevitable sensor uncertainties in lateral acceleration and yaw rate sensors, and errors in the computed road bank and slope, a pure integration of (157) would generate large error.

In step 924 a dynamic sideslip angle may be determined, such a dynamic computation calculate the integration of (157) with passing through a high-pass-filter. Such integration plus high pass filter is called an anti-integration-drift (AID) filter. Such computation can be done as in the following $$\beta_{LSC2}(k+1) = d_1 \beta_{LSC2}(k) - d_2 \beta_{LSC2}(k-1)] + \qquad (158)$$
$$n_1[d\beta_{LSC2}(k+1) - d\beta_{LSC2}(k-1)]$$
$$\beta_{LSC2}(0) = 2\beta_{mrflinr}(0)$$
$$\beta_{LSC-DYN}(k+1) = \frac{\beta_{LSC2}(k+1)}{2}$$

where $d_1$, $d_2$ and $n_1$ are the coefficients of the AID filter.

The computation in (158) captures the dynamic portion of the sideslip angle, which could be accurate during aggressive maneuvers but it could be either under-estimated or overt-estimated in less dynamic but unstable situations such as driving on a low mu road surface. For this reason, (158) above does not have much use unless a compensation for less dynamic portion can be calculated. In order to conduct less dynamic compensation, the similar scheme used in the RSG unit of the ISS may be conducted.

The less-dynamic portion might calculated from the previous computation of $v_{mrfray}$ and $v_{mrfrax}$ through the following steady-state-recovery (SSR) filtering $$\beta_{LSC-SS}(k+1) = d_1 \beta_{LSC-SS}(k) - d_2 \beta_{LSC-SS}(k-1)] + \qquad (159)$$
$$f_1 \left[\frac{v_{mrfray}}{v_{mrfrax}}\right](k+1) + f_2 \left[\frac{v_{mrfray}}{v_{mrfrax}}\right](k) + f_3 \left[\frac{v_{mrfray}}{v_{mrfrax}}\right](k-1)$$

with proper filter coefficients $f_1$, $f_2$ and $f_3$.

In step 928 the final sideslip angle may be expressed as $$\beta_{LSC} = \beta_{LSC-DYN} + \beta_{LSC-SS} \qquad (160)$$

Advantageously, the present invention provides an improved sideslip angle determination by fully utilizing the available measured and calculated signals from the ISS system. Such computation corrects for gravity and nonlinearities as well as steady state sideslip angle factors and removing low frequency drift due to the inevitable integration error due to sensor signal uncertainties such as zero-offset and temperature dependent offset drifting, error in the computed signals. Most importantly the sideslip angle calculated here is defined in the moving road plane, which reflect the true objective of the LSC and which is different from many existing calculations that are defined along the body-fixed frame.

In step 930 the vehicle and the various control systems described above may then be controlled in response to the final sideslip angle. As mentioned above, engine, brakes, steering and other actuators may be controlled to change the dynamics of the vehicle.

While particular embodiments of the invention have been shown and described, numerous variations and alternate embodiments will occur to those skilled in the art. Accordingly, it is intended that the invention be limited only in terms of the appended claims.

What is claimed is:

1. A method of controlling a vehicle comprising:
   determining a front lateral tire force;
   determining a rear lateral tire force;
   determining a linear sideslip angle from the front lateral tire force and the rear lateral tire force;
   determining a load transfer correction;
   determining a final linear lateral velocity in response to the linear sideslip angle and a load transfer correction; and
   controlling the vehicle in response to the final linear lateral velocity.

2. A method as recited in claim 1 wherein the step of determining a load transfer correction further comprises determining a load transfer correction in response to a relative roll angle.

3. A method as recited in claim 1 wherein the step of determining a load transfer correction further comprises determining a load transfer correction in response to a relative roll angle and a roll gradient.

4. A method as recited in claim 1 wherein the step of determining a load transfer correction further comprises determining a load transfer correction in response to a roll gradient.

5. A method as recited in claim 1 wherein the step of determining a load transfer correction further comprises determining a load transfer correction in response to a change of cornering stiffness reduction factor.

6. A method as recited in claim 1 wherein the step of determining a load transfer correction further comprises the step of determining a load transfer correction in response to a change of cornering stiffness reduction factor, a relative roll angle and a roll gradient.

7. A method as recited in claim 1 the steps of determining a linear sideslip angle further comprises the steps of:
   determining a reference lateral velocity at a rear axle in response to a roll gradient: and
   determining the linear sideslip angle in response to the reference lateral velocity.

8. A method as recited in claim 7 further comprising determining a reference lateral velocity at a rear axle in response to the roll gradient and a relative roll angle.

9. A method as recited in claim 1 further comprising the steps of:
   determining a reference lateral velocity at a rear axle in response to a relative roll angle; and
   determining the linear sideslip angle in response to the reference lateral velocity.

10. A method as recited in claim 1 further comprising the steps of:
    determining a reference lateral velocity at a rear axle in response to a yaw rate; and
    determining the linear sideslip angle in response to the reference lateral velocity.

11. A method as recited in claim 1 further comprising the steps of:
    determining a reference lateral velocity at a rear axle in response to a moving reference frame yaw rate; and
    determining the linear sideslip angle in response to the reference lateral velocity.

12. A method as recited in claim 1 wherein the step of determining a final linear lateral velocity further comprises determining a high frequency portion, the high frequency portion is determined in response to a lateral acceleration, a yaw rate and a longitudinal vehicle velocity.

13. A method as recited in claim 1 wherein the step of determining a final linear lateral velocity further comprises determining the final linear lateral velocity in response to a low frequency portion and a high frequency portion.

14. A method as recited in claim 13 wherein the high frequency portion is determined in response to a lateral acceleration.

15. A method as recited in claim 13 wherein the high frequency portion is determined in response to a lateral acceleration and a yaw rate.

16. A method as recited in claim 1 wherein determining a front lateral tire force comprises determining the front lateral tire force in response to a yaw rate, a pitch rate, a roll rate, a lateral acceleration and a vertical acceleration.

17. A method as recited in claim 1 wherein determining a rear lateral tire force comprises determining the rear lateral tire force in response to a rate, a pitch rate, a roll rate, a lateral acceleration and a vertical acceleration.

18. A method of controlling a vehicle comprising:
determining a moving road plane front lateral tire force;
determining a moving road plane rear lateral tire force;
determining a linear sideslip angle from the moving road plane front lateral tire force and the moving road plane rear lateral tire force; and
controlling the vehicle in response to the linear sideslip angle.

19. A method as recited in claim 18 further comprising the step of determining a final linear lateral velocity in response to the linear sideslip angle.

20. A method as recited in claim 18 further comprising determining a load transfer correction, and wherein determining a linear sideslip angle comprises determining a final linear sideslip angle in response to the load transfer correction and the linear sideslip angle.

* * * * *